United States Patent [19]

Cope et al.

[11] 4,160,926
[45] Jul. 10, 1979

[54] MATERIALS AND IMPREGNATING COMPOSITIONS FOR INSULATING ELECTRIC MACHINES

[75] Inventors: Lloyd S. Cope, Villa Park; Ladislav J. Rejda, Arcadia, both of Calif.

[73] Assignee: The Epoxylite Corporation, Anaheim, Calif.

[21] Appl. No.: 588,847

[22] Filed: Jun. 20, 1975

[51] Int. Cl.$^2$ .............................................. H02K 3/36
[52] U.S. Cl. ............................ 310/215; 174/110 N; 174/110 PM; 428/95; 310/214
[58] Field of Search ................... 310/71, 45, 214, 215, 310/208, 194; 428/95, 97, 198, 474, 480; 336/196-198; 174/110 N, 110 PM, 121 SR, 124

[56] References Cited

U.S. PATENT DOCUMENTS

| | | | |
|---|---|---|---|
| 2,320,866 | 6/1943 | Hill | 310/215 |
| 2,701,316 | 2/1955 | Willits | 310/214 |
| 2,819,514 | 1/1958 | Polard | 310/214 |
| 2,821,498 | 1/1958 | Botts | 156/276 |
| 2,836,744 | 5/1958 | Clawson | 310/208 |
| 2,935,859 | 5/1960 | Marvin | 310/215 |
| 2,993,949 | 7/1961 | Moebius | 174/121 |
| 3,037,262 | 6/1962 | Spencer | 428/97 |
| 3,476,636 | 11/1969 | Crosby | 428/95 |
| 3,476,638 | 11/1969 | Pauling | 428/198 |
| 3,481,821 | 12/1969 | Bruner | 428/95 |
| 3,483,413 | 12/1969 | Logan | 310/215 |
| 3,506,529 | 4/1970 | Sanders | 428/95 |
| 3,646,247 | 2/1972 | Sennett | 174/110 N |
| 3,655,497 | 4/1972 | Forrest | 428/95 |
| 3,735,169 | 5/1973 | Blake | 310/215 |
| 3,838,502 | 10/1974 | Sheets | 310/45 |
| 3,956,561 | 5/1976 | Anderson | 428/474 |

FOREIGN PATENT DOCUMENTS

1109958  4/1968  United Kingdom .................... 310/215

*Primary Examiner*—R. Skudy
*Attorney, Agent, or Firm*—Irons & Sears

[57] ABSTRACT

Void-free resin impregnated electric motors and generators, the process for producing their void-free resin impregnation and a preferred resin for producing void-free impregnation including a low viscosity, essentially 100 percent solids (i.e. solventless) synthetic resinous material, a thixotropic agent, a surface active agent and/or a diluent are disclosed.

18 Claims, 20 Drawing Figures

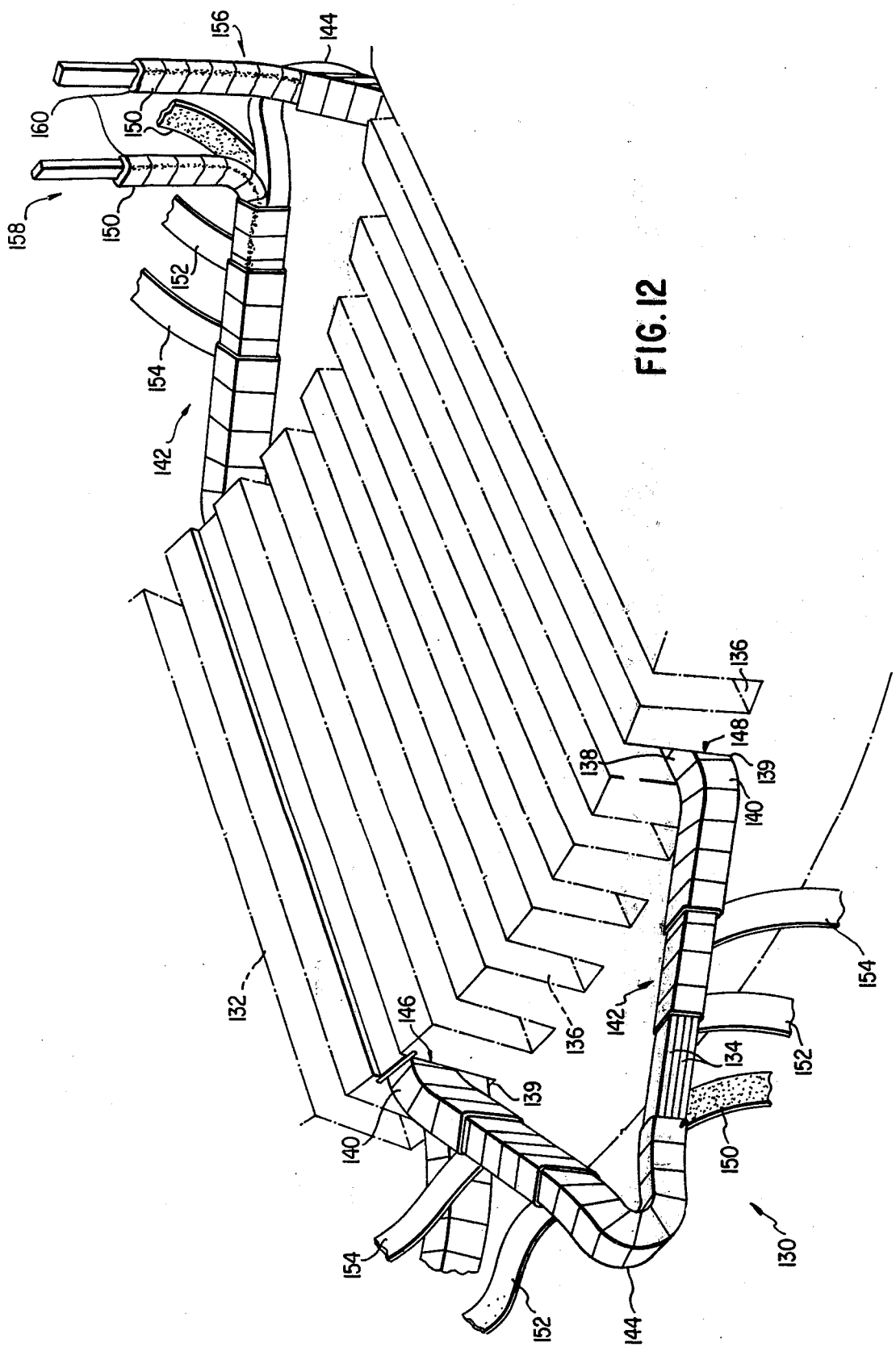

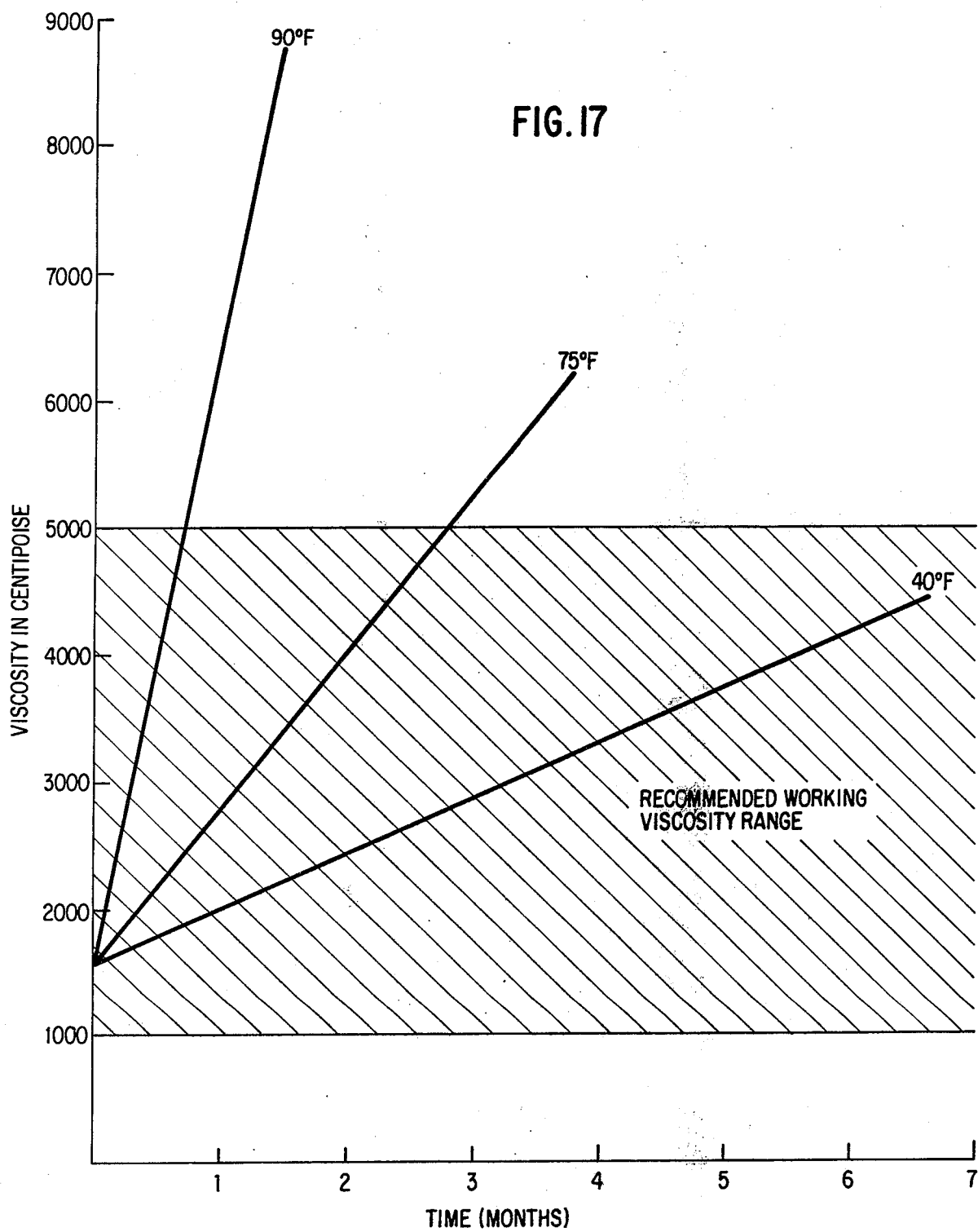

MATERIALS AND IMPREGNATING COMPOSITIONS FOR INSULATING ELECTRIC MACHINES

BACKGROUND OF THE INVENTION

1. Field of the Invention

The invention relates to void-free resin impregnated electric motors and generators of random and form wound construction.

The invention also relates to an insulation system and a process of impregnating electric motors and generators of random and form wound construction to produce a void-free fill.

The invention further relates to a preferred resin composition for impregnating electric motors and generators of random and form wound construction which produces a void-free fill when used in conjunction with the impregnating process of the invention.

2. Description of the Prior Art

Insulation of Form Coil Machines

The insulation of form coil machines has progressed through different phases of development. Originally, form wound coils were insulated with wraps of shellac-bonded mica and then impregnated with asphaltic compounds, and later, 100 percent solids synthetic resins, prior to their insertion in the winding slots of electrical motors and generators. Subsequently, mica paper or flakes resin bonded to glass tapes were impregnated with a solventless epoxy resin and this then B-staged, i.e. partially cured to a flexible nonliquid state but not finish cured to a hard thermoset, to a dry form suitable for wrapping over the coils. The slot portions of these coils were hot pressed to form them to the proper dimensions. The coils were then installed in the machine, connections made, and the wound unit placed in the oven to cure the tapes over the end turns and complete cure of the slot portion. In a still later process, the form coils were wrapped dry with mica tape, overwrapped with glass, installed within the stator and then vacuum pressure impregnated with a suitable resin composition, usually of low viscosity, long pot life and unfilled, and then cured.

There are, however, several disadvantages to the prior art processes for insulating form coil machines. When a very liquid resin is used in the impregnating process, the impregnating material drains from the unit once it is removed from the impregnating chamber and during cure. The resin does not cover flat surfaces well, and it runs out of the larger internal voids because of its low viscosity and absence of film-forming properties. To overcome the problems in production, it is often necessary to use two vacuum pressure impregnation (hereinafter VPI) cycles, and even then it may still prove necessary to apply a final coat of varnish if the motor is to meet the underwater specifications required for sealed systems. Taping over the curves of the end turns and knuckles of form wound coils with nonextensible insulating tapes, such as mica tapes, inevitably leaves some internal voids since the tapes do not conform perfectly to the shape of the coils. To minimize the voids, it is customary after the end turns have been taped with insulating tape to overwrap the end turns with a heat-shrinkable tape that pulls the insulating tape tight against the coil. This takes additional time to apply, increases material costs, considerably lengthens the pathway that subsequently applied impregnating resin must travel to completely fill the area of the end turns, and does not entirely eliminate the voids. An alternative method, even more time consuming and expensive, is to smooth out or recontour the curves of the end turns with an epoxy paste which is cured before final taping.

In the prior art, several methods have been employed to brace the coils of form wound machines against mechanical movement. Most usually, bracing has been accomplished by encircling the end turns with a surge ring and then tying the individual coils to it. In some cases, preformed laminates have been individually inserted between the individual coils and tied in place. In other cases, an epoxy resin putty is placed between the coils and allowed to cure. In still other cases, a B-staged rope is woven back and forth between coils. When VPI processing is used, individual felt pads have been wedged between the individual top and bottom coils. In all cases, the tying and blocking procedures are time consuming and not universally satisfactory.

The following U.S. patents are representative of those which disclose prior art processes for insulating form wound coils for electric machines: Nos. 2,479,417; 2,821,498; 2,836,744; 3,600,801; 3,629,024; 3,735,168 and 3,801,391.

Insulation of Random Wound Machines

A number of processes and materials have been used in the prior art for consolidating the insulation of random wound motors and generators. The simplest method is to heat the stator to a temperature sufficient to cure the top coat of magnet wire enamel. This method, however, can only be used satisfactorily in connection with bondable magnet wire. Alternatively, the stator can be dipped into an electrical grade varnish and heat cured or air dried. This procedure is generally repeated once or twice to insure adequate coverage. In another method, the stator is immersed in a paste-like 100 percent solids liquid composition and vacuum and pressure impregnated. The stator is then removed from the chamber, excess paste scraped off, and the composition cured in an oven. In a still further method, a 100 percent solids liquid is poured over the hot windings and allowed to flow through the slot area until gelation occurs. Pouring continues until a satisfactory buildup is obtained over the end turns of the windings. Pouring may be accomplished either while the stator is stationary or while it is being rotated. In another method, molds are constructed and a 100 percent solids liquid composition is then introduced and retained therein until cured. In yet another procedure, the end turns are taped before or after winding, and the stator vacuum pressure impregnated, the tightly woven tape serving to retain the resin over the end turns during cure. It is not practical, however, to tape the complete coil on the commonly encountered semi-closed slot stator design. Since in that design the conductors must be inserted a few strands at a time, the slot section cannot be consolidated by taping prior to inserting the conductors into the slots. Also, the tape on the end turns can be tightly woven because the impregnant can readily enter through the untaped slot portion. When open slots are used, the complete coil can be taped in advance of winding with open weave tape and the stator can subsequently be vacuum pressure impregnated with a 50 percent filled impregnant. The filler in the 50 percent filled impregnant blocks the interstices of the tape to prevent the liquid from running back out while the stator is being cured.

In the prior art, with the exception of the last mentioned method, the slots of the stator of random wound electric machines into which the coils are inserted are lined in advance with incompressible insulating layers called slot liners. These provide ground insulation which electrically insulates the magnet wire from the magnetic iron. These slot liners are made from paper and the like, from plastic sheet material or varnished fabric, or from combinations of materials such as fabric and sheet. A construction of Dacron tape/Mylar film/Dacron (i.e. PET fabric/film/fabric) tape is frequently used. Aramid papers are used for higher temperature service and to upgrade lower temperature machines. All of the aforementioned slot liners are characterized by a basically incompressible nature. They are relatively rigid and do not conform to the minute irregularities of the iron laminations or to the surface contours of the coil bundles, but bridge them instead. As a result, there are a number of spaces between the slot liner and the laminations and between the slot liner and the coils which leave voids after impregnation with a resinous substance. The quantity and quality of the deleterious air spaces is variable and depends upon exactly how the unit is wound, the amount of pressure finally applied by means of a top stick to lock the wound coils into the slots, and the surface conditions of the stator iron in the slot sections.

In open slot random wound electric machines when the slot portion of the coil is wrapped with tape prior to its insertion, slot liners are not used. This tape serves effectively as a slot liner after it has been impregnated. Opening the slots to permit fabrication by insertion of previously wound coils results in loss of magnetic material and lowers efficiency below that of random wound motors having semi-closed slots. U.S. Pat. No. 3,436,815 discloses a random wound electric machine having open slots.

The following U.S. Patents are representative of those which disclose slot liners and prior art processes for insulating random wound coils for electrical machines: Nos. 2,935,859; 3,436,815; 3,505,729 and 3,838,502.

Voids in Form and Random Wound Electric Machines

For a number of reasons, the prior art has recognized that it is functionally desirable to completely fill the dead air space in the slot area of electric motors and generators with a dense solid plastic material. First, the greatest possible mechanical strength is insured. Second, the possibility of introducing environmental contaminants into contact with exposed magnet wire enamel through communicating passageways is eliminated. Third, by replacing dead air space with a plastic having substantially greater heat conductivity, the apparatus will operate with a lower hot-spot temperature and as a result will prove more durable. Fourth, filling any voids in the slot area minimizes the likelihood of electrical shorts between the individual conductors which comprise the composite coils. Finally, on the higher voltage machinery, internal corona is eliminated.

It has been found that 100 percent solids low viscosity materials can be used satisfactorily to penetrate these internal dead air spaces. Satisfactory penetration of 100 percent solids low viscosity materials, however, does not ensure complete retention. If the stators are merely dipped, vacuum and pressure treated, and removed from the impregnating materials, the resin will run out while the stator is drained or while it is being cured.

Various material retention techniques are used in the production of form coils to prevent the formation of voids. It is possible to cure under sufficient pressure to overcome the gravity head leading to flow. However, that technique is not suited for treating completed stators. The impregnating materials can be retained with molds and give satisfactory fill. They can be allowed to trickle through the hot windings and harden. If properly implemented, the trickle technique eliminates most voids. Retention has been achieved over the end turns by applying one or more layers of tape to them. However, taping of the slot area is impossible unless open slot stator designs are used. When heavy paste-like materials are used, voids are formed which are not filled by the application of high pressure. In all cases, solvent containing varnishes, which have excellent penetrating ability, are unsuited for filling voids because they contain a large percentage of vehicle which must be volatilized.

Volume Displacing Materials in Random and Form Wound Electric Machines

Volume displacing materials have been used to displace volumes within the slots which are not filled by the coils during winding. The materials help to tightly pack the coils into the slot and facilitate the achievement of a void-free fill after impregnation. Materials which have been used for this purpose are nonimpregnatable, noncompressible laminates or films.

Serviceability of Void-Free Electric Machines

Even when the voids are filled with a 100 percent solids impregnant, difficulty may be encountered in service. The impregnant shrinks during cure, and when subjected to repeated heating or cooling during operation, cracking or pull-away of the cured impregnant in the slot area may admit environmental contaminants. If the impregnant is formulated to be flexible and to withstand shrinkage stresses and thermal cycling without cracking, it will have a high thermal expansion rate and will tend to expand into the bore area when the motor heats up, ultimately interferring with the free movement of the rotor. Highly filled plastics reduce the problem of slot growth and provide lower shrinkage during cure. However, filled or unfilled rigid plastics formulated for higher temperature operation are relatively brittle and prone to fracture.

With open slot motors, the slot portion of the coil can be wrapped with tape and impregnated to form a laminate which gives great resistance to cracking in service. The technique cannot be used with the semi-closed slot motors which constitute well over 90 percent of the total random wound production.

Insulation of Connections

Prior art methods of insulating the connections of windings in both random and form wound coils have exhibited certain disadvantages. The butt-type connection in which sections of two external leads from different composite coils are butted together in surface contact and brazed to form a high continuity electrical connection is usually insulated by taping with electrical tape or by slipping a sleeve over it and potting it in a paste-like epoxy resin. It has been found that taping does not eliminate internal voids and that the application of the epoxy resin to fill these voids in the butt-type connections has been both time consuming and expensive. The "U"-type connection which consists of sections of two external leads from different composite coils which are butted together in surface contact in a "U" configuration and brazed to form a high continuity electrical connection is conventionally taped with insulating tape or occasionally potted with the aid of an expendable mold. These methods, however, are either uncertain in their results or time consuming in their application.

Impregnating Materials

Solution Coatings

The earliest impregnating materials for motors and generators were solvent containing, air-dry, oleoresinous (black) varnishes. A vat was filled with the varnish and then the wound stator portion of the apparatus was immersed therein, removed from the varnish, allowed to drain and retained for about 24 to 48 hours while the thin coat of varnish polymerized in the atmosphere. This process was time consuming, and the varnish used in this process could not withstand prolonged heating, thus limiting the upper operating temperature of the apparatus.

The black varnishes were eventually improved to the point where they became much more serviceable as motor insulation. They were gradually replaced, however, with varnishes based on more sophisticated synthetic resins, such as polyesters, epoxies, silicones, acrylics, polyurethanes, and the like, and recently, with aromatic imides and specially modified aromatic imide varnishes capable of prolonged operations in excess of 200° C. These newer varnishes, although vastly improved as to temperature resistance, chemical resistance, physical properties, and electrical insulating qualities, are still carried in solution and optimally deposited as films that are seldom thicker than about 1 to 2 mils. They are used in essentially the same manner as the original black varnishes, although they are now heat convertible and can be cured in a few hours in an oven, thus shortening the processing time.

With varnish solution coatings, it is customary to dip and bake the coils more than once. Since the varnish is usually very fluid, it wets out the other insulation components fairly well, although a single dip will leave some quantity of pin holes in the cured film caused by the escape of the solvent and may leave some areas incompletely covered which must be completely covered. Therefore, a second or even a third coat must be applied. When tight windings or optimum penetration in the shortest period of time are desired, the varnishes can be used in connection with vacuum and atmospheric pressure, vacuum and superatmospheric pressure, or ultrasonic vibration. In addition, the apparatus can be dipped while it is warm to further increase the fluidity of the impregnant. All of these techniques are presently employed commercially with solution coatings. With two or more dips and bakes, thorough impregnation and film coverage of the components can be obtained. Even with two or more dips and bakes, however, it is impossible to obtain continuous void-free fill. In a commercially feasible varnish impregnation technique, it is impossible to obtain a stator in which the larger interstices are completely occluded and the air is completely displaced. Voids inevitably result from the impregnation with solution coatings because of the evolution of solvent during cure and the attendant shrinkage.

Thus, it can be seen that regardless of whether the earliest black varnishes or the more recent polyimides are used, stators dipped and baked in solution coatings will contain a certain quantity of internal voids in the coil bundle, within the tapes of the end turns and slot sections, and between the coil bundles and magnetic irons of the slots which deleteriously affect motor operation. These voids often communicate with the environmental permitting conductive and corrosive contaminants to attack the magnet wire insulation and ultimately produce an electric short. They also produce heat traps and result in hotter operation than would result if they were replaced with a plastic mass of higher thermal conductivity. Also, as a result of the voids, the entire mass of insulation is not unitized and the individual coils may move independently under mechanical abuse, thermal cycling, and electric surges, thus permitting the insulation to abraid and ultimately fail. In the higher voltage units, these air pockets are focal points for corona which will erode the insulation and cause failure thereof.

Solventless Impregnants

In those cases where stators could be wound with taped coils, asphalt came to be used as an impregnating material for higher voltage machines. Individual formed coil bundles were insulated through the slot area with one or more layers of shellac-bonded book mica. Normally, the slot section was hot pressed as the layers of mica were applied. This process was repeated as often as necessary to achieve the desired thickness of micaceous insulation. A final layer of fabric tape was applied over the whole coil. The wound coil was then immersed in asphalt, heated to the point of fluidity, and vacuum and pressure were used to impregnate the structure. The insulated coil was then inserted into the stator slots. The asphalt materials and the shellac, like the black varnishes, offered limited resistance to temperature, thereby limiting the operating temperature of the apparatus.

In theory at least, the earlier asphalt-impregnated coils were less subject to other disadvantages of the varnished coils. The asphalt did not contain volatiles which had to escape during cure, and when placed by pressure within a void of the coil bundle beneath layers of retaining tapes, it tended to remain where it was during the cooling process. Thus, by the use of hot asphalt on suitably taped coils which were impregnated under optimally controlled vacuum and pressure cycles, reasonably thorough fill was achieved throughout the coil, and major voids were eliminated. This procedure is suitable for use on form wound coils which are taped throughout and inserted into open slots, but is not suitable for use on random wound motors and generators where the coil bundle is inserted a few strands at a time through a semi-closed slot.

The asphalts used in form coil insulation were ultimately replaced by synthetic resins formulated to be used without solvents, i.e., to be 100 percent solids, and to be liquid at the processing temperature which was optimally room temperature, although the coils were often warm when dipped to increase the fluidity of the impregnant. The synthetic materials offered improved heat resistance, chemical resistance, strength properties, and provided superior insulating characteristics. Eventually, use of these new resins permitted processing the wound stator as a unit rather than requiring the coils to be processed individually before winding.

Impregnation and retention of synthetic 100 percent solids liquid impregnants within form wound coil stators is enhanced when the coils are very tightly taped and the impregnants are forced through the taped constructions by superatmospheric pressure after drawing off moisture, air, gases and volatiles by vacuum. The inability of the fluid impregnant to provide a continuous exterior film over the stator may result in the production of communicating passageways into the magnet wire enamel. The elimination of these passageways is accomplished by a final application of solution coating. Because the impregnant is liquid in nature, it may drain in some areas from internal interstices through taping defects or through the lead areas. Even with the best of the unfilled impregnating systems, complete void-free fill throughout the slot area and over the end turns has not been accomplished with much better success than the fill which had been accomplished in actual practice with the earlier asphalt materials.

When applied to lower voltage form coil machines and to random wound electric machines, the 100 percent solids liquid impregnants offer a number of advantages over the solution coatings. Because they do not contain solvents, they do not pose equivalent air pollution and fire hazards to the solution coatings. More significantly, however, they provide functional advantages over the solution coatings. The 100 percent solids impregnants can be applied in relatively thick sections. Unlike solution coatings which are only useful when applied in very thin sections to allow escape of the solvents, thus requiring an impractically large number of sequential treatments to build up an appreciable thickness of impregnant, the 100 percent solids liquid impregnants can fill interstices within coil bundles in a single impregnation treatment. Also, unlike the solution impregnants, which shrink by 50 percent or more during cure due to the necessary escape of volatile solvents, the 100 percent solids impregnants harden in substantially the same volume as when they were applied. The 100 percent solids impregnants harden to dense impermeable masses, whereas the solution coatings contain a network of passageways as a result of solvent escape. A single treatment with a 100 percent solids impregnant will often be sufficient to achieve functional results which are unobtainable with multiple coats of solution coatings.

The 100 percent solids liquid impregnants do possess one substantial disadvantage when they are applied by dip and bake processes. In comparison with the solution coatings, they are at best relatively viscous and do not as readily wet out and saturate other included insulation components. With solution coatings, additional solvent can be used to improve wetting and penetration with little or no sacrifice in cured properties, whereas with 100 percent solids liquid impregnants, suitable nonvolatile diluents almost inevitably reduce desirable cured properties in proportion to their concentration. The selection of suitable diluents for the 100 percent solids impregnants, in fact, involves the balancing of a number of factors. The lower cost diluents are predominantly low functionality species having undesirable low boiling points, and, therefore, are capable of being pulled off under vacuums otherwise desirable to facilitate production and minimize the size of internal voids and of being volatilized during otherwise desirable elevated curing temperatures. On the other hand, polyfunctional diluents, which do not have such a substantial effect on the cured properties of thermosetting plastics, are generally more expensive and are required in rather high concentrations since they are not as efficient as the monofunctional diluents in reducing the viscosity. In nearly all cases, both mono- and polyfunctional diluents disadvantageously increase shrinkage over the undiluted species because they produce a higher volume concentration of reactive sites, and usually result in some reduction of heat resistance in the final polymer. Nonreactive diluents tend to degrade thermosetting networks and lead to long-term dimensional instability. Therefore, use of diluents should be avoided if possible and minimized when not. Unfortunately, the best of the liquid plastics offering the necessary cured properties, i.e., mechanical strength, chemical resistance, heat resistance, and electrical insulating properties, are unsuitably viscous requiring diluent concentrations in the range of about 10-20 percent or more to obtain sufficient fluidity. Even small reductions, in these diluent concentrations improve the cured properties of the impregnants.

When a formulation is prepared for VPI processes, it is particularly desirable to minimize the initial concentration of diluent. Even the best of the VPI formulations progressively thicken in storage, and it may occasionally be necessary to return the viscosity to specification by thinning with additional diluent or by withdrawing some portion of the material in the tank and replacing it with freshly catalyzed formulation. If a high diluent concentration is present in the original formulation, the addition of more diluent to the aged material will not be practical and a costly withdrawal/replenishment technique will have to be used, with the withdrawn material either worked off in other applications or scrapped out.

VPI Processing

Optimal penetration and low viscosity are exceptionally important when 100 percent solids impregnants are used in VPI processing. In VPI processing, the wound stator is placed in the impregnating chamber, the pressure is reduced, and the impregnant is admitted to the chamber. Superatmospheric pressure is then applied to the chamber to force the impregnant into the windings of the stator. Following impregnation, the stator is removed from the chamber, allowed to drain and then baked to cure the impregnant. In order to prevent the impregnant from draining excessively from the windings, special taping arrangements, such as those described above, are used. The impregnant is forced through the interstices of the outer tape wrappings and between the overlaps of any mica into the underlying coil bundle. The impregnant, therefore, must be sufficiently fluid to be forced through these tight constructions under feasible production conditions.

Even though maximum fluidity is the normal requirement, it has been found possible to use quite viscous 100 percent solids formulations containing about 50 percent by weight of non-thixotropic particulate, 200-325 mesh fillers, such as silica or talc, under special circumstances as retention aids. Suitable formulations are sufficiently fluid at higher temperatures, and are used for the treatment of specially designed, open slot random wound motors. These motors, as previously described, utilize fully taped coils. When a stator is vacuum pressure impregnated, the liquid impregnant matrix is forced through the fairly open-weave tape, with the filler particles being filtered out in the tape to block the interstices. Thus, when the stator is removed from the impregnating tank, the impregnant drains from the areas not taped and is retained within the tapes by the filler within the interstices. Such systems, however, are not suited for use with coils which are not taped in the slot area, since the impregnant will not be retained therein during bake. Because of the high temperatures involved, small processing chambers and high production are required for the process to be at all economically feasible.

SUMMARY OF THE INVENTION

The invention relates to improved electric motors and generators having void-free resin impregnated electric coils, a process for impregnating the electric coils and a preferred resin composition used for impregnating the electric coils.

In accordance with the invention, void-free impregnation of the slot area of electric coils in random wound electric machines is obtained by vacuum pressure impregnation of slot liners having a two layer construction consisting of a layer of high dielectric heat resistant material to which is bonded a layer of wettable, impregnatable and compressible nonwoven or cut or uncut piled fabric. The layer of heat resistant high dielectric material is disposed in surface contact with the slots of the electric machine. The layer of high dielectric material facilitates the development of a cleavage plane between the slot surface and the coils to relieve thermally induced or other types of environmental stress. The layer of wettable, impregnatable and compressible fabric is disposed in surface contact with the coils. The fabrics have a free surface energy greater than the surface tension of the impregnating material and preferably are constructed from polyethylene glycol terephthalate (hereinafter PET). When impregnated, the fabrics reinforce the cured impregnating materials and assist in retaining the resin in the coil bundle during elevated temperature cure.

To further reinforce random would electric machines against thermal or other types of environmental stress, the previously described slot liner is extended into the end turn area of the electric coils and disposed in surface contact with a layer of armoring tape which covers the end turns. By overlapping the slot liner and the armoring tape, a continuous impregnatable fiber-reinforced coil covering is formed which spans the slots and end turns of the coils.

In accordance with the present invention, the area beneath the top stick may be reinforced by adding a laminate consisting of an intermediate layer of high dielectric heat resistant material such as PET film or aramid paper to which is bonded an upper and a lower layer of wettable, impregnatable and compressible nonwoven or cut or uncut piled fabric. The fabrics have a free surface energy greater than the surface tension of the impregnating material and preferably are constructed from PET. The upper layer of fabric is disposed in surface contact with the inner nonwoven or cut or uncut piled fabric surface of the slot liner of the present invention. The lower layer contacts the random would electric coils. A conventional top stick is then inserted into the top of the slot to tightly compress the coils. Upon impregnation, the surface contact of the upper layer of fabric and the slot liner produces a continuous fiber-reinforced area which spans the top of the slot.

A separator for electrically isolating top and bottom composite coils contained within a slot in random and form wound electric machines constructed according to the present invention consists of an intermediate layer of high dielectric heat resistant material to which is bonded on both sides a layer of wettable, impregnatable and compressible nonwoven or cut or uncut piled fabric. The fabrics have a free surface energy which is greater than the surface tension of the impregnating materials and preferably are constructed from PET. When impregnated, the fabrics reinforce the cured impregnating material to prevent shifting of the coils with respect to each other because of thermal or other types of environmental stress and electrically isolate the top and bottom coils from each other.

Form wound coils constructed according to the present invention are insulated with wrappings comprising one or more layers of a wettable, impregnatable and compressible nonwoven or cut or uncut piled fabric. The form wound coils constructed in accordance with the present invention preferably have three layers of wrappings. A first layer of wettable, impregnatable and compressible nonwoven or cut or uncut piled fabric is wrapped completely over the knuckles and extends at least partially over the end turns. The fabric has a free surface energy greater than the surface tension of the impregnating material and is preferably constructed from PET. Over the first layer, one or more wrappings of mica tape are wound. The mica tape is wrapped over the entire form wound coil. A layer of armoring tape is wrapped completely over the wrappings of mica tape. The fabric retains the impregnating materials to produce a high dielectric reinforced void-free fill of the knuckles and the end turns.

Structural bracing of the end turns and knuckles of form coil electric machines is accomplished by inserting a continuous sheet of wettable, impregnatable and highly compressible nonwoven or cut or uncut piled fabric around the outside of the stator between the top and bottom composite coils during their insertion into the stator slots and thereafter impregnating the stator. The fabric is highly compressed during installation to create socket-like structures between its points of contact with the top and bottom composite coils. After impregnation, the socket-like structures provide mechanical reinforcement of the end turn area against loading modes. The fabrics have a free surface energy greater than the surface tension of the impregnating materials and preferably are constructed from PET.

"U"-type connections constructed according to the present invention comprise two layers of insulation wrapped over sections of two external leads that are coupled to different composite coils which are in surface contact with each other to form a "U" configuration. The leads are brazed together to form a high continuity electrical connection. The first layer is constructed from a wettable, impregnatable and compressible nonwoven or cut or uncut piled fabric. The first layer is wrapped around the high continuity electrical connection to force the leads into the compressible fabric. The fabric has a free surface energy which is greater than the surface tension of the impregnating material and is preferably constructed from PET. The second layer consists of a wrapping of armoring tape.

A butt-type connection used in form coil machines constructed according to the present invention comprises a high continuity electrical connection of two surface contacting sections of external leads which are coupled to different composite coils of an electric machine. The high continuity electrical connection is wrapped with a layer of fabric which is ensheathed with a sleeve that compresses the leads into intimate surface contact with the fabric. The layer of fabric is of a nonwoven or cut or uncut piled construction that is wettable, impregnatable and compressible. The fabric has a free surface energy which is greater than the surface tension of the impregnating material and is preferably constructed from PET.

A butt-type connection used in random wound machines constructed according to the present invention comprises a high continuity electrical connection of surface contacting sections of two external leads which are respectively coupled to different composite coils of an electrical machine. The connections are ensheathed with a sleeve which is wrapped with a layer of wettable, impregnatable and compressible fabric of a nonwoven or cut or uncut piled construction. The fabric has a free surface energy greater than the surface tension of the impregnating material and is preferably constructed from PET.

Insulation of electrical connections and external leads of composite coils in the end turn region of random wound electrical machines constructed according to the present invention comprises enveloping the electrical connections and external leads prior to impregnation with a layer of wettable, compressible and impregnatable nonwoven or cut or uncut piled fabric having a free surface energy which is greater than the surface tension of the impregnating material to be used. The envelopment of the electrical connections of the external leads is accomplished by placing a first strip of the fabric around the outside of the stator in the end turn region, pressing the wrapped electrical connections and external leads into the fabric, placing a second strip of fabric over the electrical connections and external leads to envelop them, tying the strips of fabric in place over the electrical connections and external leads and impregnating the strips of fabric. After impregnation, the electrical connections and external leads in the end turn region are completely filled to produce a void-free reinforced fill.

In accordance with the present invention a layer of nonwoven or cut or uncut piled fabric having a free surface energy greater than the surface tension of the impregnating material to be used may be used as a reinforcing and/or an insulating material anywhere in the slot or end turn area of electric machines by inserting the fabric into the stator areas requiring reinforcement and/or insulation at the time of fabrication of the stator and thereafter impregnating the composite stator with an impregnating material.

Materials in accordance with the present invention for displacing volumes contained within the slots and other areas of random and form wound machines which are not filled by the electrical coils comprise wettable, impregnatable and compressible nonwoven or cut or uncut piled fabrics having a free surface energy which is greater than the surface tension of the impregnating material. The fabric is preferably constructed from PET. Upon impregnation, the fabric forms a continuous void-free volume displacement which completely fills those volumes not occupied by the electrical coils.

An impregnant composition of the present invention comprises an essentially 100 percent solids synthetic resin, a minor amount of a thixotropic agent, a surface active agent and/or a diluent.

BRIEF DESCRIPTION OF THE DRAWINGS

FIG. 12 illustrates a composite form wound coil during fabrication of the stator core.

FIG. 17 is a plot of viscosity of the thixotropic 100 percent solids liquid impregnant compositions of the present invention versus time for a given temperature at which the impregnant is maintained.

DESCRIPTION OF THE PREFERRED EMBODIMENTS

In accordance with the broadest aspects of the present invention, it is possible to completely impregnate the electric coils of both form and random wound electric machines with an impregnating material. Complete void-free impregnation is accomplished by selective lining of slots and selective wrapping of the coils with materials which are compressible, wettable and impregnatable with an impregnating material. Complete void-free impregnation of the electrical coils, which necessarily includes complete fill and retention of the impregnant, is accomplished by controlling factors which affect wettability, namely providing high free surface energy impregnatable materials, low surface tension impregnants and capillary size interstices within the impregnatable materials. The surface tension of the impregnant is controlled by addition of a surfactant and/or diluent. Free surface energy is controlled by the choice of the material used for lining the slots and for wrapping the electric coils. The size of the capillary interstices is determined by the fiber content of the materials used for lining the slots and wrapping the coils. The retention of the impregnant within the interstices of the impregnatable materials is enhanced by addition of a thixotroping agent which preferably is fibrous asbestos. Capillarity and a surface energy of the impregnatable materials greater than the surface tension of the impregnant cause retention in capillary-size interstices. In larger interstices, however, it is thioxotropy which primarily causes retention of the impregnant.

In accordance with the invention, if the factors discussed above are properly controlled, it is possible to use lower vacuum, lower pressure, lower temperature and shorter dwell times for impregnating electric machines.

INSULATIVE MATERIALS

Figure 1:
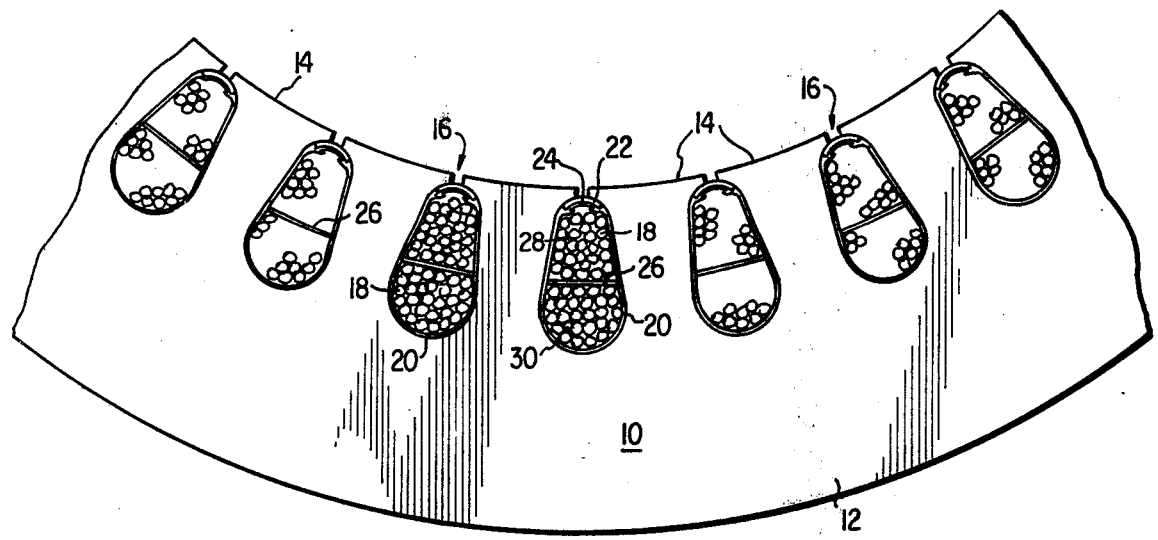
FIG. 1 is a sectional view of the interface between the core and the end turns of a random wound stator constructed according to the invention.

A stator 10 of a random wound electric machine constructed according to the present invention is illustrated in FIG. 1. Stator core 12 has a plurality of pole pieces 14 within which are disposed a plurality of semiclosed slots 16 which hold the individual stator coils 18. Because of the semi-closed slots 16, the individual coils 18 are inserted into the slots a few turns at a time. In each of the slots 16, there is disposed a slot liner 20 which is described in detail in conjunction with FIGS. 2a and 2b. Top sticks 22 are provided at the top of the slots 16 to retain the electrical windings within the slots. The top sticks 22 should be wettable by the impregnating material being used. The top sticks 22 are preferably constructed from aramid paper. The area underneath the top stick 22 may be reinforced by the addition of a reinforcing layer 24. The construction of the reinforcing layer 24 is described in detail in conjunction with FIGS. 3a and 3b. In each of the stator slots 16, a separator 26 is provided for electrically isolating the top and bottom composite coils 28 and 30. The separator 26 is also described in detail in conjunction with FIGS. 3a and 3b.

Figure 2A:
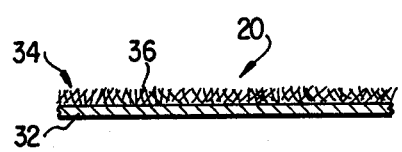
FIG. 2a is an illustration of the construction of the preferred embodiment of the slot liner described in FIG. 1.

FIG. 2a illustrates the preferred construction of the slot liner 20 discussed above in conjunction with FIG. 1. The slot liner 20 should exhibit a combination of stiffness and resiliency to allow it to be readily inserted into and conform to the surface of the slot. The slot liner 20 has two layers 32 and 34. The first layer 32 is constructed from a high dielectric heat resistant plastic which preferably is PET or aramid paper. PET films are useful for service conditions up to 155° C. hot spot and aramid papers are useful to above 180° C. hot spot or to upgrade quality in tough duty machines. Aramid is a generic term for aromatic nylons derived from the reaction of diacid chlorides (such as isophthaloyl chloride) and aromatic diprimary amines (such as phenylenediamine). The materials are more fully described in Lee and Neville's New Linear Polymers, McGraw-Hill Book Co. Inc. (1967). The first layer 32 enhances the development of a controlled cleavage plane between the interface of the slot area and the first layer in situations where the forces exerted by thermal expansion and contraction are so high that some form of stress relief is essential. For this reason it is not necessarily desirable that the first layer is immoveably bonded to the slots. It will therefore be appreciated that when it is desired to create a cleavage plane between the slots and the slot liner 20, the first layer 32 need not be wettable by the impregnant and may even be treated to prevent an impregnant from bonding to it. The layer 34 consists of a wettable, impregnatable and compressible nonwoven fabric 36 which has a free surface energy that is greater than surface tension of the impregnating material to be used and preferably is constructed from PET.

Figure 2B:
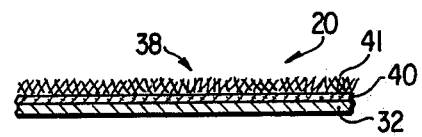
FIG. 2b is an illustration of an alternative embodiment of the slot liner described in FIG. 1.

FIG. 2b illustrates the alternative embodiment of the construction of the slot liner 20 which has been discussed above in conjunction with FIG. 1. As in the preferred embodiment of the slot liner 20, the alternative embodiment of the slot liner 20 should exhibit a combination of stiffness and resiliency to allow it to be readily inserted into and conform to the surface of the slot. The slot liner 20 has two layers 32 and 38. Layer 32 is identical to the layer 32 described in conjunction with FIG. 2a. The second layer 38 is a fabric having a backing 40 to which are attached cut or uncut piled fibers 41. The second layer 38 should be wettable, impregnatable and compressible and have a free surface energy which is greater than the surface tension of the impregnating material to be used and preferably is constructed from PET. The compressibility of the second layer 38 permits the closely spaced coils contained in the slots to be pressed into the fibers 41.

In both the preferred embodiment and in the alternative embodiment of the slot liner, the fabric reinforces the cured impregnating material and assists in preventing movement of the coils because of the effects of thermal or other types of environmental stress.

After a stator 10 has been fabricated with coils 18 which have been pressed into either the preferred or the alternative embodiment of the slot liner 20 discussed above in FIGS. 2a and 2b and removed from the impregnating bath, the slot liners 20 retain the impregnant by capillary action in its interstices. This retention prevents the formation of internal voids within the interstices during curing of the impregnating materials.

Although the liquid impregnant shrinks during cure, the fibers of the nonwoven fabric 36 or the piled fabric 38, which displace a substantial volume of the slot area, do not shrink. As a result, the absolute amount of shrinkage in the slot area is reduced to insure stronger bonds of the slot liner 20 with the electrical coils 18.

The preferred depth of the nonwoven fabric 36 and the piled fabric 38 is determined by the dimensions of the slots.

Figure 3A:
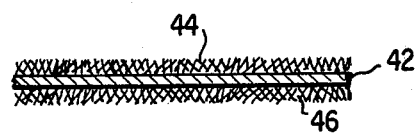
FIG. 3a is an illustration of the construction of the preferred embodiment of the separator and reinforcing layer described in FIG. 1.

FIG. 3a illustrates the detailed construction of the preferred embodiment of the reinforcing layer 24 and the separator 26 described above in conjunction with FIG. 1. The reinforcing layer 24 and the separator 26 includes an intermediate layer 42 constructed from a high dielectric heat resistant plastic such as PET or aramid paper and two outside layers 44 and 46. The outside layers 44 and 46 are constructed from a wettable, impregnatable, and compressible nonwoven fabric having a free surface energy which is greater than the surface tension of the impregnating material to be used. The fabric is preferably constructed from PET. When used as a reinforcing layer, the layer 44 is compressed into surface contact with the nonwoven fabric 36 or the piled fabric 38 of the slot liner 20 described in conjunction with FIG. 1 and the layer 46 is compressed into surface contact with the top of coil 28. The use of layer 44, while preferable, may be omitted. When used as a separator 26, the top layer 44 and the bottom layer 46 are compressed into surface contact respectively with the top and bottom composite coils 28 and 30 described in conjunction with FIG. 1.

Figure 3B:
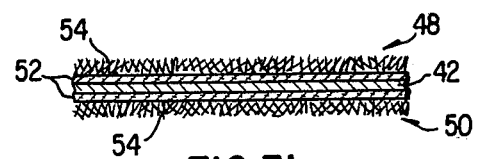
FIG. 3b is an illustration of the construction of an alternative embodiment of the separator and reinforcing layer described in FIG. 1.

FIG. 3b illustrates an alternative embodiment of the reinforcing layer 24 and the separator 26 described in conjunction with FIG. 1 above. The reinforcing layer 24 and the separator 26 include an intermediate layer 42, which is identical to intermediate layer 42 described in conjunction with FIG. 3a and two fabric layers 48 and 50 which are constructed from a cut or uncut piled fabric which is identical to the fabric layer 38 described in conjunction with FIG. 2b. Each fabric layer 48 and 50 has backing 52 to which are attached cut or uncut piled fibers 54. When used as a reinforcing layer, the piled fibers 54 of layer 48 are compressed into surface contact with the nonwoven fabric 34 or the piled fabric 38 of the slot liner 20 described in conjunction with FIG. 1 and the piled fibers 54 of layer 50 are compressed in surface contact with the upper composite coil 28. The use of layer 48, while preferable, may be omitted. When used as a separator 26, the top fabric layer 48 and the bottom fabric layer 50 are compressed into surface contact respectively with the top and bottom coils 28 and 30 described in conjunction with FIG. 1. After impregnation with an impregnating material, the fibers within the preferred and the alternative embodiment of the reinforcing layer 24 and separator 26 reinforce the cured impregnating materials.

Figure 4:
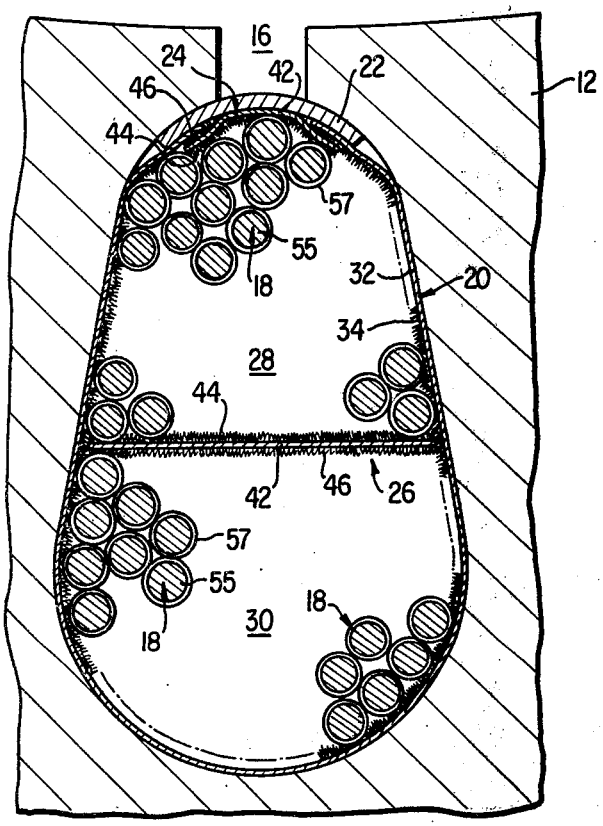
FIG. 4 is a schematic sectional view of a single stator slot of a random wound electric machine constructed according to the present invention.

FIG. 4 illustrates the detailed construction of a single slot of a random wound electric machine constructed according to the present invention. Identical parts in FIGS. 1 and 4 are identified by identical reference numbers. The slot 16 is formed from the stator core 12. A plurality of individual windings 18 are disposed within slot 16 to form the composite upper and lower coils 28 and 30. Each winding 18 consists of conductor 55 ensheathed by a layer of insulation 57. The individual windings are tightly held in the slot 16 by the top stick 22 and reinforcing layer 24. As described with reference to FIG. 2a above, slot liner 20 preferably consists of layers 32 and 34 in which layer 32 is disposed in surface contact with the walls of the slot 16 and layer 34 is in surface contact with the coils 18. After insertion of the coils 18 into the slot, the coils located nearest slot liner 20 are compressed into the compressible layer 34 of the slot liner 20. As discussed above, layer 32 may be treated to not be wettable by the impregnating material. Separator 26 electrically isolates the top and bottom composite coils 28 and 30. When the preferred separator 26 is used which is illustrated in FIG. 3a, the top and bottom composite coils 28 and 30 are compressed into the fabric layers 44 and 46 to enhance complete fill and retention of the impregnating material in the separator area. The top stick 22 is added after insertion of the composite coils 28 and 30 and reinforcing layer 24 to hold the composite coils tightly within the slots 16. The top stick 22 is preferably constructed from a material which is wettable by the impregnating materials to produce a strong bond therewith after impregnation with an impregnating material. As described with reference to FIG. 3a above, fabric layer 44 of reinforcing layer 24 is compressed into surface contact with upper composite coil 28. After impregnation, the slot liner 20 and reinforcing layer 24 form a continuous fiber reinforcement which bridges the top of the slots 16 which tightly holds the composite coils 28 and 30 in place within the slots.

Figure 5:
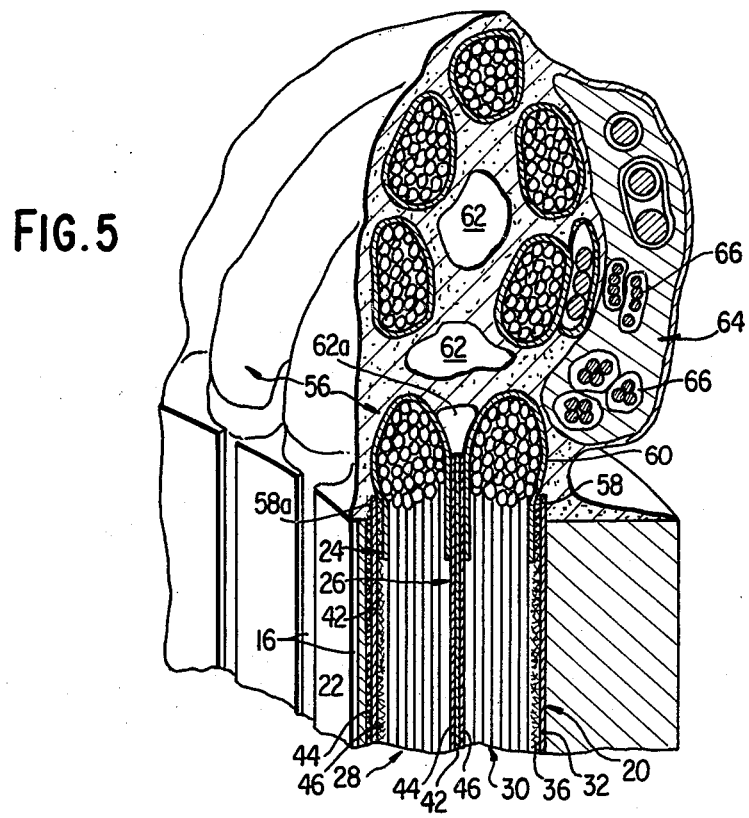
FIG. 5 is a sectional view of the slots and end turns of a random wound machine constructed according to the present invention.

FIG. 5 illustrates a section of the slots and end turns of a random wound electric machine constructed according to the present invention. Identical parts in FIGS. 1, 2, 3 and 5 are identified by identical reference numerals. The sections of the upper and lower composite coils 28 and 30 disposed outside of the slots 16 comprise the end turns 56. At the point of exit from the slots 16, both the upper and lower composite coils 28 and 30, which comprise the end turns 56, are straight. At a point remote from the slots 16, the upper composite coils 28 gently bend to the right. At a point remote from the slots 16, the lower composite coils 30 gently bend to the left (not shown). At a point remote from the slots 16, the upper composite coils 30 curve into the plane of FIG. 5 (not shown) to permit a coil to be wound into one slot as an upper composite coil 28 and wound into another slot as a lower composite coil 30 in a manner well known to those skilled in the art. The slot liner 20 which comprises layers 32 and 36 has an extension 57 which extends to a point slightly outside of the slot 16. The length of the extension 57 is not critical. The reinforcing layer 24 which comprises intermediate layer 42 and outer layers 44 and 46 extends outside the slot 16. The length of its extension 58 is not critical. The extensions 57 and 58 overlap a layer of armoring tape 60 which is wrapped over the end turns 56. The armoring tape should be wettable and impregnatable by the impregnating materials. Preferably, the armoring tape 60 is constructed from woven glass or PET. The overlap of extensions 57 and 58 and armoring tape 60 is formed by extending the armoring tape 60 underneath the extensions. If reinforcing layer 24 is not used, the top stick 22 may be extended outside the slot 16 so that its extension and extension 58 overlap layer 60 of armoring tape. If space exists, the armoring tape may be extended underneath the extensions 57 and 58 into the slot area 16. The separator 26 which comprises intermediate layer 42 and outer layers 44 and 46 may be extended outside the slot 16. The positioning of the armoring tape 60 underneath the extensions 57 and 58 forms a fiber-reinforced joint. After impregnation, the composite coils 28 and 30 are continuously impregnated throughout the slot and end turn area. The continuously impregnated composite coils 28 and 30 are very similar to the coils which are obtained when the slots of a stator are opened up to permit composite pretaped coils to be inserted prior to impregnation of a random wound electric machine. This construction is also similar to the coils which are obtained in form coil electric machines. After impregnation, the end turn region is completely impregnated with the exception of some nonfunctional voids 62 which extend between the upper and lower composite coils 28 and 30 at a point remote from their exit point from the slots 16 and functional void 62a, which is intentionally provided between the upper and lower composite coils 28 and 30 at a point in proximity to the exit point of the upper and lower composite coils 28 and 30 from the slots 16. The void 62a permits air to flow past the upper and lower composite coils 28 and 30 to enhance cooling. The insulation of region 64 which includes a plurality of external leads 66 and electrical connections (not shown) is described with reference to FIGS. 6–8 hereinafter.

The composite windings of a random wound stator are fabricated by electrically coupling individual composite coils together in a manner well known to those skilled in the art of connecting electric machine windings. The particular winding design is governed by the type of the electric machine and its operating specifications. Random wound electric machines constructed according to the present invention are not limited to any particular type of winding design.

Figure 6:
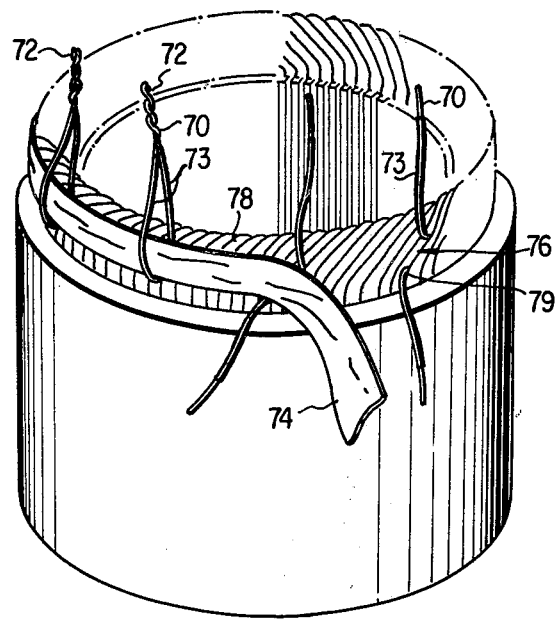
FIGS. 6-8 illustrate the insulation of the electrical connections of the external leads of electrical coils in the end turn region of random wound electrical machines.
Figure 7:
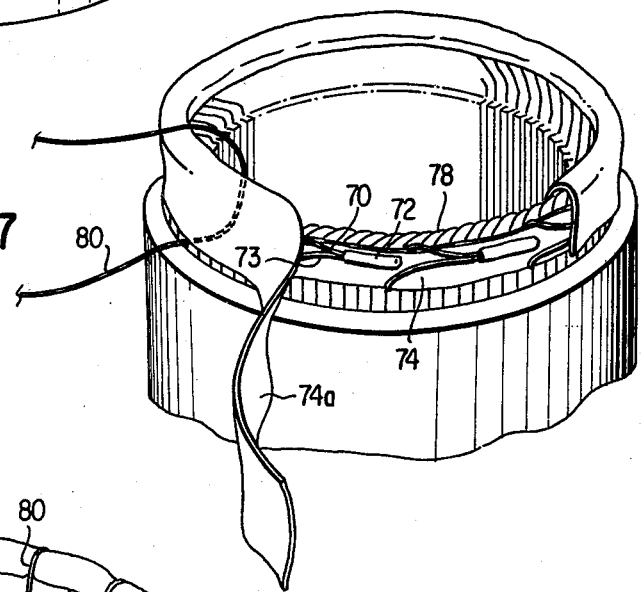
Figure 8:
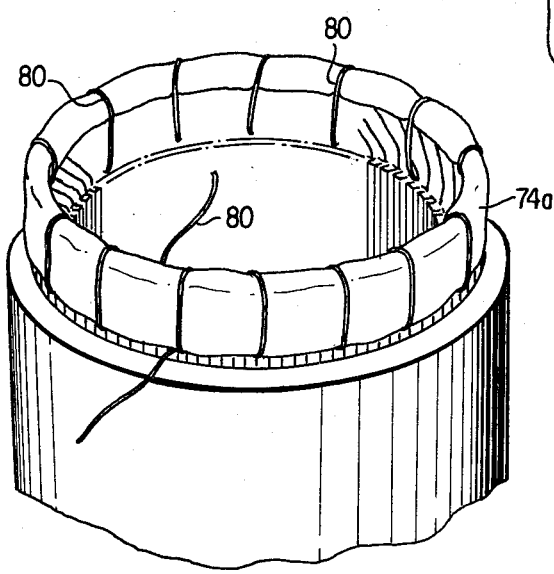

FIGS. 6–8 illustrate the method of constructing and construction of the insulation and reinforcement of the external leads and electric connections of the composite electrical coils in the end turn region of random wound electrical machines. In FIG. 6, a plurality of external leads 70 are connected together to form electrical connections 72. Each of the external leads 70 has a sleeve 73 ensheathing it from its point of exit 79 from the end turns 78 up to the point where the leads 70 are banded together to form electrical connections 72. The electrical connections 72 may be of any type such as, but not limited to, the butt and "U"-type connections illustrated in FIGS. 15 and 16 and explained hereinafter. A first strip of material 74, which is preferably identical to the material illustrated in FIG. 10a but alternatively may be identical to the material illustrated in FIG. 10b, is placed around the outside of the stator core 76 in surface contact with the end turns 78. The electrical connections 72 initially extend up above the strip of material 74. The strip of material 74 should span the displacement between the external leads 70 at the points of exit 79 from the end turns 78. In FIG. 7, a second strip 74a is shown being placed over the external leads 70 and electrical connections 72 which have been insulated in the same manner as the insulation of the electrical connections illustrated in FIG. 15. The electrical connections 72 are bent down and compressed into surface contact with the strip of material 74. The strips of material 74 and 74a envelope the external leads 70 and electrical connections 72 when the strip of material 74a is placed over the external leads and the electrical connections. FIG. 8 illustrates the complete envelopment of the external leads 70 and electrical connections 72 by the strips of material 74 (not shown) and 74a. A plurality of ligatures 80 hold the strips of material 74 and 74a in place. After impregnation, strips 74 and 74a form an insulative void-free fiber reinforcement of the external leads 70 and electrical connections of the end turns 78 of a random wound electrical machine.

It should be noted that a single strip of material may alternatively be used to envelop the external leads 70 and electrical connections 72 instead of using two strips of material 74 and 74a. The single strip of material should have a width in a doubled-over configuration sufficient to span the displacement between the external leads 70 at their points of exit 79 from the end turns 78.

Figure 9:
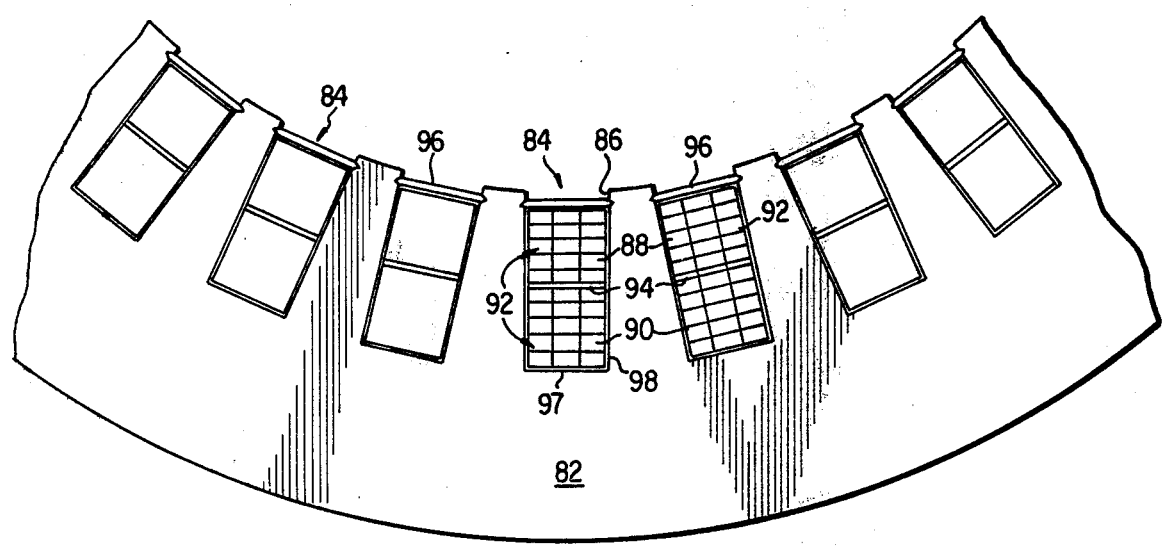
FIG. 9 is a sectional view of the interface between the core and the end turns of a form wound electric machine constructed according to the present invention.

FIG. 9 illustrates the stator core 82 of a form wound electric machine constructed according to the present invention. The stator core 82 is divided into a plurality of slots 84. Each slot 84 has an opening 86 at its top to permit the insertion of composite upper and lower form wound coils 88 and 90 respectively. Each composite coil 88 and 90 is comprised of a plurality of individual coils 92 preferably having a rectangular or square cross-section to permit the maximum amount of electrical conductor to be disposed in the slots 84. A separator 94 may be inserted between the top and bottom composite coils 88 and 90 respectively to provide additional slot fill and dielectric strength therebetween. The separator 94 is identical to the separator described above in conjunction with FIGS. 3a and 3b. A top stick 96 is disposed at the top of the slot 84 to anchor the composite upper and lower coils 88 and 90 within the slots. Shims 97 and 98 may be added to displace any volumes in the slot 84 not filled by the composite upper and lower coils 88 and 90. The shims 97 and 98 may be constructed from one or more layers of fabric.

Figure 10A:
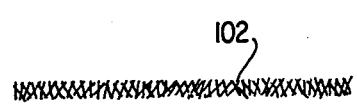
FIG. 10a illustrates the preferred embodiment of the shims, reinforcing and volume displacing materials constructed in accordance with the present invention.
Figure 10B:
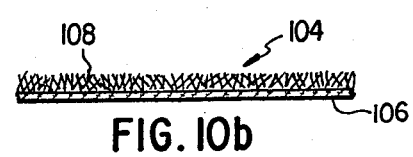
FIG. 10b illustrates an alternative embodiment of the shims, reinforcing and volume displacing materials constructed in accordance with the present invention.

FIG. 10a illustrates the preferred embodiment of the material 102 used for constructing the shims used in the present invention. The shims are constructed from one or more layers of a wettable, impregnatable and compressible nonwoven fabric 102 having a free surface energy which is greater than the surface tension of the impregnating materials to be used. The fabric is preferably PET.

FIG. 10b illustrates an alternative embodiment of the material 104 used for constructing the shims used in the present invention. The shims are constructed from a wettable, impregnatable and compressible cut or uncut piled fabric having a free surface energy which is greater than the surface tension of the impregnating materials to be used. The fabric 104 is preferably PET. The fabric 104 includes a backing 106 to which are attached cut or uncut piled fibers 108.

When impregnated, fabrics 102 and 104 comprise a void-free impregnated mass which displaces the volume of the slots which is not filled by the composite coils.

It should be understood that the fabrics 102 and 104 may also be used in random wound electric machines to displace any volume in the slots which is not filled by the composite coils.

Figure 11:
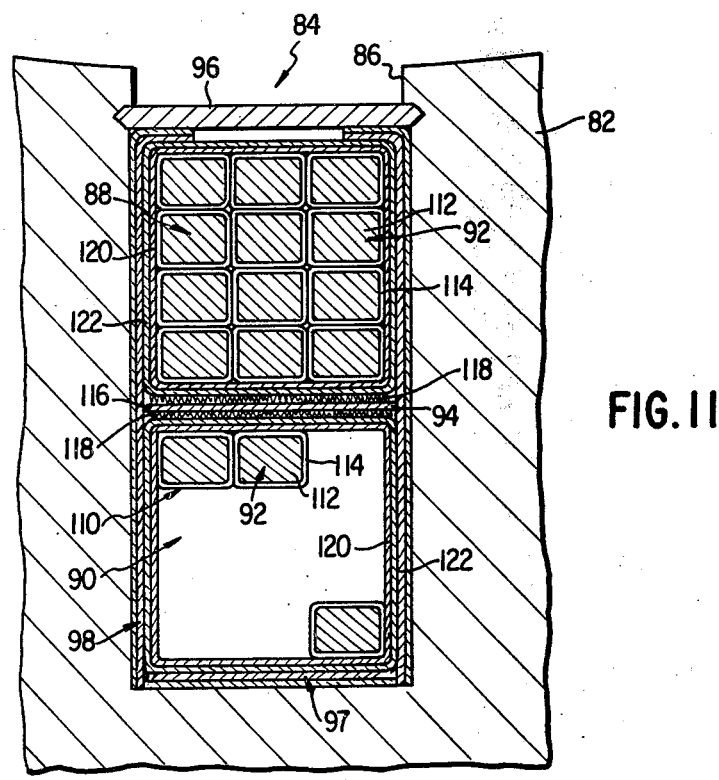
FIG. 11 is a sectional view of a single stator slot of a form wound electric machine constructed according to the present invention.

FIG. 11 illustrates a section of a single slot 110 of a form wound electric machine constructed according to the present invention. In FIGS. 9 and 11 identical parts are identified by identical reference numerals. The shims 97 and 98 have been illustrated as double layers of fabric. The number of layers is determined by the volume which must be displaced in the slot. However, it should be noted that the use of shims 97 and 98 is not required in those instances where the composite form coils 88 and 90 and associated insulating and armoring tapes 152 and 154 displace the entire volume of the slots 84. Each individual coil 92 consists of an inner section of electrical conductor 112 which is ensheathed by a layer of electrical insulation 114. Separator 94 electrically isolates the upper and lower composite coils 88 and 90 and prevents axial and transverse movement of the composite coils when impregnated by an impregnating material. The separator 94 has a high dielectrical intermediate layer 116 to which on both sides is attached a layer of wettable, compressible and impregnatable fabric 118. The separator is identical to the separator described in conjunction with FIG. 3a above. However, the separator described in FIG. 3b may alternatively be used. The composite upper and lower coils 88 and 90 have one or more layers 152 of mica insulation wrapped in surface contact completely around the composite coils. For purposes of illustration, only one layer of mica insulation 152 is shown. The number of layers of mica insulation 152 is determined by the operating voltage of the electric machine. A layer of armoring tape 154 is wrapped over the mica layers 152 of the individual upper and lower composite coils 88 and 90. Layers 152 and 154 are wrapped on the individual coils prior to insertion of the composite coils 88 and 90 into the slots 84. Layers 152 and 154 are conventionally used in constructing form wound electric machines.

FIG. 12 illustrates a composite form wound coil 130 constructed according to the present invention during fabrication of a stator 132. The composite coil 130 is constructed from multiple windings 134 of an insulated electrical conductor. Each composite coil 130 is bent into a predetermined shape so that it is adapted to be disposed into the open slots 136 of the stator 132. Each form wound composite coil 130 includes a pair of straight sections 138 which are respectively disposed in different slots 136. At the ends of the straight sections 138 at or beyond the point of exit from the slots 139, bends 140 define the beginning of the end turns 142. The end turns 142 are part of the section of the coil which is disposed outside the slots 136 when the coil is inserted into the slots. The end turns 142 end at the knuckles 144 which are bends in the composite coil 130 that permit one of the straight sections 138 of the composite coil to be inserted into the top section 146 of one slot 136 and the bottom section 148 of another slot 136 within a pole of an electric machine. In a stator of a form wound electric machine constructed according to the present invention, a layer of fabric 150 is wrapped completely over the knuckles 144 and at least partially over the end turns 142 prior to wrapping the entire composite form wound coil 130 with the conventional mica and armoring tape wrappings 152 and 154, respectively. The front and rear sections of FIG. 12 show the fabric 150 and tape wrappings 152 and 154 in section prior to completion of wrapping. The fabric 150 is preferably identical to the fabric illustrated in FIG. 10a, although the fabric illustrated in FIG. 10b may also be used. When the alternative fabric illustrated in FIG. 10b is used, the piled side is turned toward the composite form coil 130. A pair of external leads 156 and 158, which are the respective ends of the composite coil 130, project from the composite coil 130. The external leads 156 and 158 are used for electrically coupling together a plurality of composite coils to fabricate a composite pole winding. The external leads 156 and 158 are also wrapped with fabric 150 from their point of exit from the composite coil 130 to an intermediate point 160 located on the external leads. Upon impregnation with an impregnating material having a surface tension of less than the free surface energy of fabric 150, capillary action between the fibers which comprise the fabric and the impregnating material assists in drawing the liquid impregnating material through the mica 152 and armoring tape 154 wrappings into the interstices of the capillary network of the fibers of the fabric 150 and into surface contact with the composite coil 130 to produce a fiber-reinforced void-free fill of the end turns 142 and knuckles 144.

Figure 13:
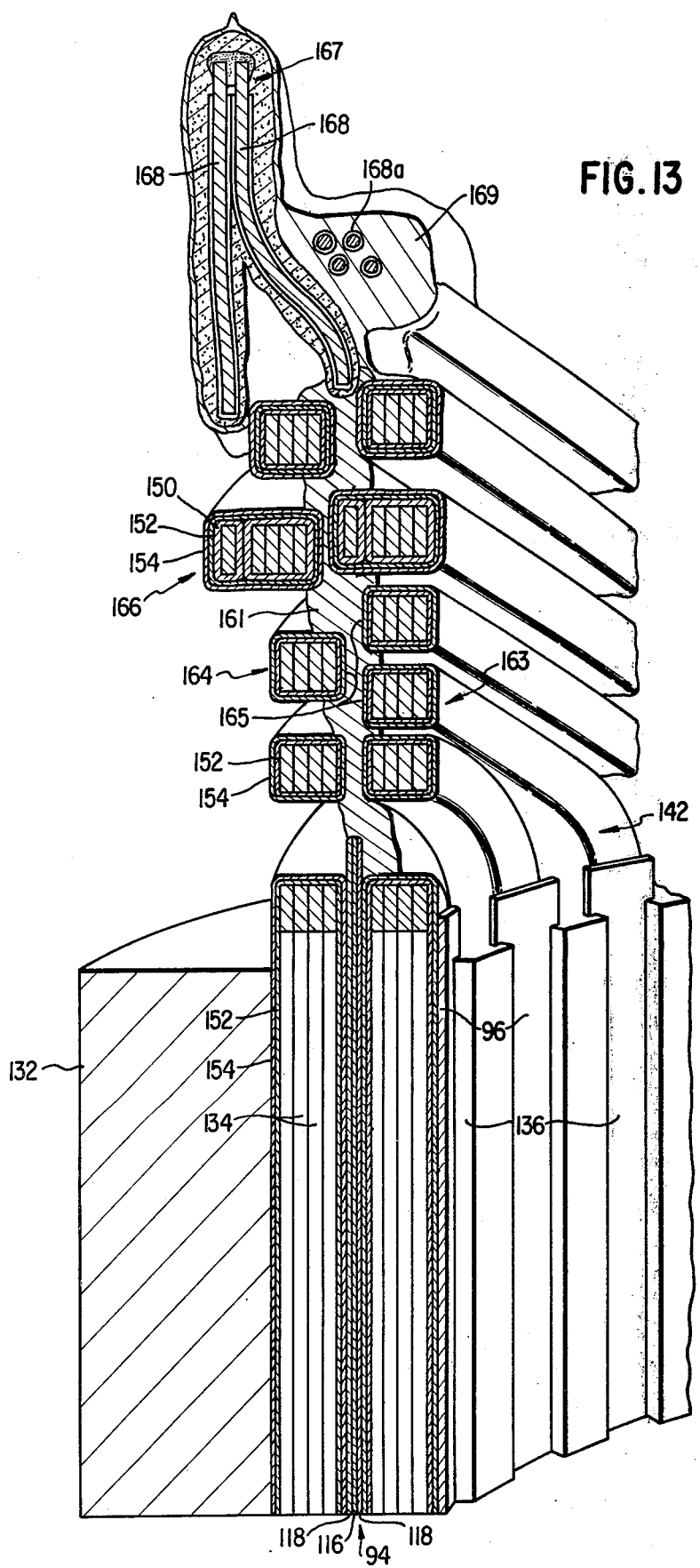
FIG. 13 illustrates a sectional view of the slots, end turns of a form wound electric machine constructed according to the present invention.

FIG. 13 illustrates a sectional view of the slots and end turns of a form wound electric machine constructed according to the present invention. In FIGS. 11, 12 and 13 identical numbers are used to identify identical parts. Reinforcement of the end turns 142 and knuckles (not shown) is accomplished by placing a thick, wettable, impregnatable and compressible layer of non-woven fabric 161 completely around the outside of the stator 132 between the end turns 142 of the top and bottom composite coils 163 and 164. The layer of fabric 161 spans at least part of the end turns 142 and may extend to the knuckles. The fabric 161 should be compressed between the top and bottom composite coils 163 and 164 so that it completely bridges the gap between the composite coils to form deep depressions 165 which create socket-like structures that anchor and reinforce the end turns 142 and knuckles after impregnation with an impregnating material. The fabric 161 has a free surface energy which is greater than the surface tension of the impregnating material and preferably is constructed from PET. The preferred fabric is identical to the fabric illustrated in FIG. 10a although it is possible to use a fabric having a cut or uncut pile on both the upper and lower sides which has been preferably constructed from PET as illustrated in FIG. 3b. The individual fibers, which comprise the fabric layer 161 reinforce the cured impregnated materials. The separator 94 comprises intermediate layer 116 and outer layers 118. The separator 94 is identical to the separator described in FIG. 11. One or more conventional layers of mica insulation 152 and armoring tape 154 are used to insulate the composite coils 163 and 164 in the slots and over the part of the end turns 142 which are not wrapped by fabric 150 as illustrated in FIG. 12. The insulation 166 of the end turns also described with reference to FIG. 12 above is shown in section in FIG. 13. The insulation 166 comprises fabric layer 150, mica wrappings 152 and armoring tape wrappings 154. The composite form wound coils 163 and 164 have insulation identical to that of the composite form wound coil illustrated in FIG. 12. FIG. 13 also illustrates a butt-type electrical connection 167 of external leads 168 which is described hereinafter in detail in conjunction with FIG. 14.

A plurality of additional leads 168a are disposed around the outside of the stator 132. Leads 168a are enveloped with an insulating material 169 which is identical to the insulating material used in the insulation of the electrical connections and external leads described in FIGS. 6–8.

It will be recognized by those skilled in the art that the principles of this invention can also be applied to the insulation of wound rotors and d.c. armatures as well as stators.

Figure 14:
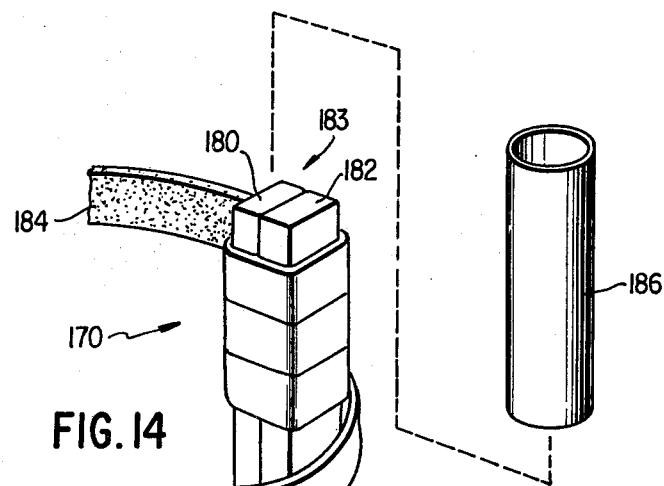
FIG. 14 illustrates a butt-type connection of external leads in a form wound electric machine constructed according to the present invention.

FIG. 14 illustrates a butt-type connection 170 used for electrically connecting together external leads of different composite coils during fabrication of a composite winding in a form wound electric machine constructed according to the present invention. The butt-type connection 170 comprises a pair of external leads 172 and 174 which have curved sections 176 and 178 and surface contacting sections 180 and 182. The sections 180 and 182 are brazed together to form a high continuity electrical connection 183. After brazing sections 180 and 182 together, the high continuity electrical connection 183 is wrapped with a wettable, impregnatable and compressible fabric layer 184. Fabric layer 184 has a free surface energy greater than the surface tension of the impregnating material and preferably is constructed from PET. The preferred construction of the fabric 184 is identical to the fabric illustrated in FIG. 10a. However, the fabric illustrated in FIG. 10b may be used alternatively. A laminate of reinforcing material (not shown) may be attached to fabric layer 184 provided the reinforcement does not make the fabric layer so stiff that it cannot sufficiently conform to the surface irregularities in sections 180 and 182 and electrical connection 183. If a piled fabric is used, the pile is turned inward so that the cut or uncut piled fibers are in surface contact with the sections 180 and 182 and electrical connection 183. An impregnated sleeve 186 is forced over the fabric 184 to compress it into surface contact with the surfaces of sections 180 and 182 and electrical connection 183. The sleeve 186 is preferably constructed from woven glass or PET.

The fabric layer 184 is extended along the curved sections 176 and 178 of the external leads 172 and 174 to the point of intersection 160 of fabric layer 184 with the wrappings 150 which have been described with reference to FIG. 12 above. Accordingly, the composite external leads 172 and 174 are wrapped with a continuous fabric layer which extends from their point of exit from the composite coil as illustrated in FIG. 12 to the butt-type connection 170 of the external leads as illustrated in FIG. 14.

Figure 15:
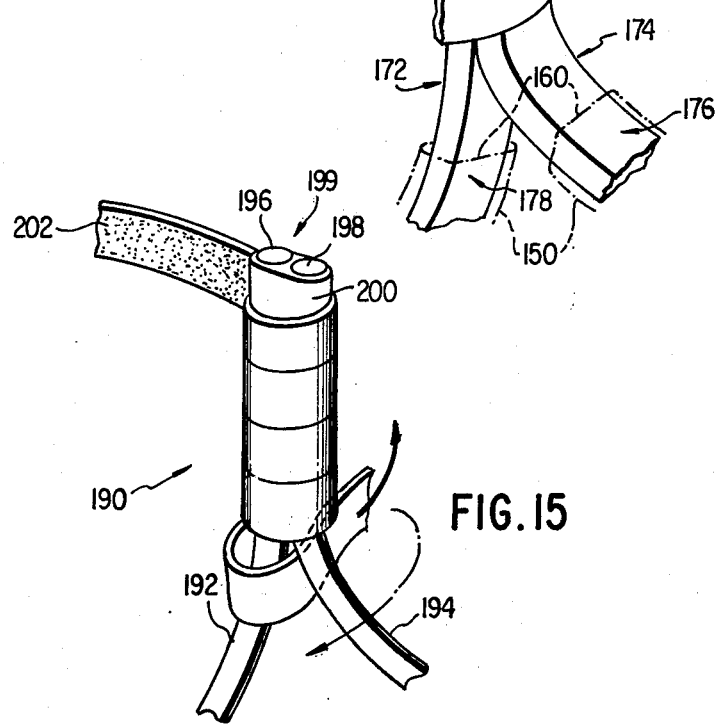
FIG. 15 illustrates a butt-type connection of external leads in a random wound electric machine constructed according to the present invention.

FIG. 15 illustrates a butt-type connection 190 of external leads 192 and 194 in a random wound electric machine constructed according to the present invention. Sections 196 and 198 of the respective external leads 192 and 194 of different composite stator coils are brazed together to form a high continuity electrical connection 199. Sections 196 and 198 may be straight or twisted together in a helix like configuration. An unimpregnated sleeve 200 is forced over the brazed connection of sections 196 and 198. The sleeve 200 is preferably constructed from woven glass or PET. A layer of wettable, impregnatable and compressible fabric 202, which has construction and physical characteristics identical to those of the fabric previously described in FIG. 14, is wrapped over the sleeve 200. Then, the composite butt-type connection 190 is bent into and tied against the end turns of the random wound machine to retain it during impregnation as illustrated in FIG. 7 and impregnated.

Figure 16:
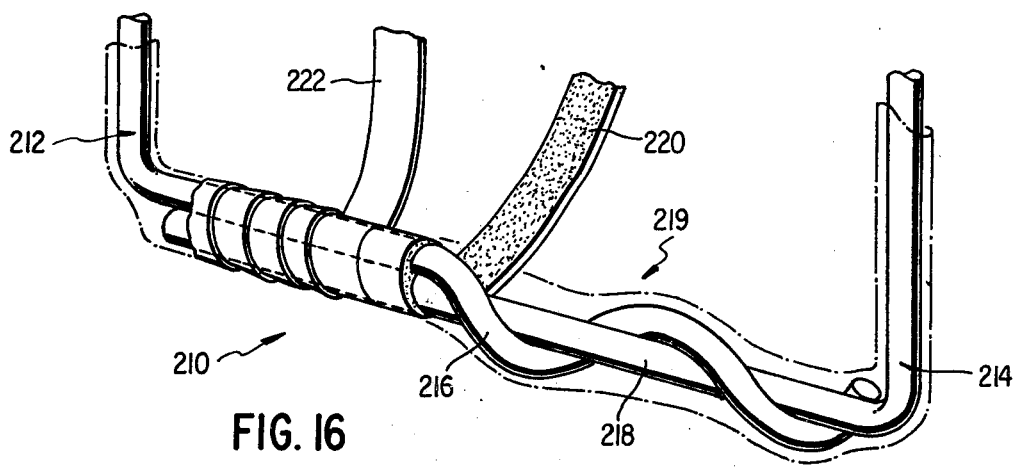
FIG. 16 illustrates a "U"-type connection of external leads in a random wound electric machine constructed according to the present invention.

FIG. 16 illustrates a "U"-type connection 210 constructed according to the present invention for electrically connecting together external leads 212 and 214 of different composite coils. "U"-type connections may be used as an alternative to the use of butt-type connections described above in either random or form wound electric machines. External leads 212 and 214 are respectively bent into an "L" shape. The bases 216 and 218 of the external leads may be twisted together in a helix or joined together as straight sections. The bases 216 and 218 of the respective "L" shaped leads 212 and 214 are brazed together to form a "U" shape connection which includes a high continuity electrical connection 219. A layer of wettable, compressible and impregnatable fabric 220, which has a construction and physical characteristics identical to those of the fabric described above in conjunction with FIGS. 14 and 15 is wrapped over the "U"-type connection 210. A layer of armoring tape 222, which may be constructed from woven glass or PET, is wrapped over fabric layer 220. The "U"-type connection 210 is thereafter impregnated by an impregnating material during impregnation of the stator to form a fiber-reinforced void-free connection.

In accordance with the present invention, the wettable, compressible and impregnatable nonwoven or cut or uncut piled fabrics described above in FIGS. 10a and 10b may be used as volume displacing and insulating and reinforcing materials anywhere in the slots or in the end turn region of form or random wound electric machines. Examples specifically described above are the shims in the slots of random and form wound machines, the bracing of the end turns between the upper and lower composite coils in form wound machines, and the enveloping of the external leads and electrical connections in the end turns of random and form wound electric machines.

IMPREGNANTS

In accordance with the present invention, essentially 100 percent solids liquid impregnants are provided which are useful for impregnating all types of electric machines, including motors, generators, transformers, magnetic chucks, shaker coils, etc. The impregnants of the present invention are capable of penetrating tightly wrapped coil constructions and forming a coating at least several mils thick over their external surfaces that will be retained during an elevated temperature cure cycle without reliance on impregnatable tapes over the coil extensions, end turns and connections as described above.

The 100 percent solids liquid impregnants suitable for use in the present invention include epoxy resins, polyesters, thermosetting acrylics, polyurethanes, silicone systems, and the like. The formulations should be essentially free of solvents. In their initial form, they should be liquid at room temperature or readily liquefied by the use of diluents. Generally, diluents will be required to obtain the necessarily low viscosity in the formulations, although there are some cases where their use is either not required or required in only small amounts, such as 2 to 3 percent. For example, certain low viscosity liquid anhydride curing agents can be used in combination with low viscosity diepoxy resins as described by Lee and Neville in the Handbook of Epoxy Resins, McGraw-Hill Book Co., Inc. (1967) to produce suitable materials which do not require dilution. In general, the formulations are selected to provide undiluted viscosities as low as possible consistent with handling requirements and cured properties. The viscosities are then generally reduced through the use of 2 to 20 percent of a suitable reactive diluent. In view of the limitations on upper viscosities discussed hereinafter, when a thixotropic agent is added, the parent viscosity of the undiluted resin/curing agent combination should be below about 1500 centipoises at room temperature ($\approx 25°$ C.) if a diluent is to be omitted.

A large number of diluents are suitable for use with the various formulations. The diluents may be nonreactive or reactive, and if the latter, mono- or polyfunctional. The diluents, when used, should be added in amounts sufficient to reduce the viscosity of the formulation to below about 1500 centipoises at room temperature, and preferably to about 500 centipoises at impregnation temperatures. Suitable diluents for polyesters are styrene and the like. Aliphatic mono- and diepoxies are suitable diluents for epoxy resins, and alcohols are suitable diluents for epoxy resins used with certain curing agents. Aliphatic mono- and diacrylates are suitable diluents for the more viscous aromatic diacrylates. The diluents should be selected so that they are stable to below about 500 microns of Hg vacuum and do not volatilize at the final curing temperature which is below about 150° C. and usually from about 120° C. to about 135° C. at atmospheric pressure. They must also be compatible with the resins on storage and not adversely affect the cured properties.

Resins which are based on low molecular weight starting monomers are initially very fluid. With low molecular weight starting monomers, there are a large number of reactive sites per unit volume. Since each reaction results in a little shrinkage, considerable shrinkage results when all of the reactions occur. Higher molecular weight monomers, which are correspondingly less fluid, have fewer reaction sites per unit volume, and as a result, cure with less shrinkage. From the standpoint of shrinkage, therefore, higher molecular weight species are preferred. The physical properties of the cured polymer depend on the nature of the units in the resin backbone and on pendant chains. Best results are usually obtained with impregnant formulations in which some of these units are alicyclic or aromatic structures which tend to increase the parent viscosity of the starting monomers. Since relatively high molecular weight, partially alicyclic or aromatic monomers must be used to obtain lowest shrinkage and best cured properties, the starting monomers necessarily have relatively high viscosities, and, therefore, for most current commercial epoxy, polyester and diacrylate formulations, some amount of diluent is required.

Thixotropy can be imparted to the liquid resin system of the present invention by means of high-surface-area inorganic fillers. Suitable thixotropic fillers include finely-divided fibrous asbestos and fumed silica, which is available commercially under the trade names Cab-O-Sil and Aerosil. Although the use of such thixotropic agents is well known in the plastics technology, they have not been used heretofore in formulations designed for the VPI treatment of form coils, and of random wound and form wound stators, presumeably because it was not believed possible to move thixotropic formulations through tightly taped windings. In fact, when thixotropic agents are used in amounts required to prevent flow in substantial thickness, such as $\frac{1}{8}$ inch or more, it is not possible with normal processing cycles to achieve penetration and fill. Only when the thixotropic agents are used within the limits set forth in the present invention can impregnants be formulated which can be moved through tight form coil windings utilizing the normal 500–1000 microns of Hg vacuum and 90–100 p.s.i. positive pressure. Tight form coil windings are those form coil windings which are wrapped with impermeable films or substantially impermeable tapes such that the impregnant can enter the enclosed coil bundle only through unsealed electrical lead exits or through the minute separations between individual layers of tape, and not directly through the interstices of the woven tapes. Mica tapes and papers are illustrative of this type of tape.

We have found that the thixotropic agent can be present in an amount sufficient to permit deposition of a thin coating over exposed components, such as the coatings obtained with two or three dips and bakes of a varnish, and still permit such penetration. Normally the exterior coating obtained with this concentration of thixotropic agent is from a few mils to about 10–20 mils thick.

In accordance with the present invention, impregnant compositions are obtained by adding a thixotropic agent to a low viscosity, essentially 100 percent solids material having a room temperature viscosity no higher than about 1500 centipoises and preferably below about 500 centipoises at impregnation temperatures, which generally range from about 32° C. to about 54° C., in an amount sufficient to increase the viscosity of the formulation to no more than about 5000 centipoises, and preferably, to between about 1300 to about 4000 centipoises. It will be recognized that the amount of thixotroping agent used will depend upon the original viscosity of the starting material as well as the specific nature of the thixotroping agent.

When the thixotropic impregnant composition is made according to the present invention and the electrical apparatus is removed from the processing cycle and cured, the impregnant will be retained within the interstices of the coil bundles, slot area, and over the wrapped wires of the knuckles, end turns and connections which are insulated with the materials of this invention. After cure, voids contained within the apparatus below a critical size are completely filled with hardened impregnants.

Curing agents for the impregnant formulations used in VPI systems should be selected to provide long tank stability with relatively rapid cure at a given elevated temperature. In general, the tank stability should be as long as possible, subject, of course, to end property requirements. Cure times should be kept to a reasonable limit. Ideally, the tank stability should be indefinite at a material replenishment rate that corresponds to actual usage. For example, if 10 percent of the mixed material is used and replaced each week, the viscosity should remain indefinitely within specification limits under this usage condition. If, however, the replenishment rate is greater, such as 100 percent every 24 hours, then long-term stability would be less desirable since the tank stability would only have to be in excess of 24 hours. Cure temperature should ideally be limited to those normally used for varnish curing and probably should generally not exceed about 150° C. Preferably, cure should occur in a practical time period, generally about 6 to 8 hours, at about 120° to 135° C., and more preferably in 2 to 4 hours at that temperature range.

Further in accordance with the present invention, impregnant formulations are provided having improved wettability and reduced diluent concentrations. This is achieved by adding a small amount of a surface active agent (surfactant) to the thixotropic, low-viscosity impregnants discussed above. The term "surfactant" as used herein refers to a material capable of reducing the surface tension of the impregnant formulation without having a corresponding effect on the viscosity. Any effective surfactant known to the general technology that is stable to at least 500 microns of Hg vacuum when used with VPI processes is satisfactory, provided that it does not react with any ingredient in the formulation in such a way as to interfere with the surface activity, and that it does not volatilize at the normal temperatures used during the treatment processes involved.

The addition of a surfactant to reduce the surface tension of the impregnant is most effective when the other wettability factors are favorable. For example, the components of the electric machine to be impregnated should be easily wetted, i.e., they should have high free surface energies. Nonpolar plastics, such as silicone rubber, Teflon, polyethylene, polypropylene and the like, should be avoided unless their surfaces are treated to insure wettability.

Insulation materials and cleaning procedures are selected to provide surfaces with sufficiently high free surface energies throughout the electric machine. Once this is achieved, the remaining factor which affects wettability is the surface tension of the impregnant. It is preferable that the surface tension of the impregnant be lower than the lowest free surface energy of the composite components of the insulation system. Surface tension can be lowered by using diluents, either reactive or nonreactive, in proportion to the concentration of diluent within the practical range. Surface tension can also be decreased by an increase in temperature. When the temperatures or diluent concentrations of prior art impregnants were increased to improve their wetting and penetrating characteristics, their surface tensions were necessarily lowered. Prior to the present invention, however, it was not recognized that surfactants could be used to reduce reliance on temperature control and to minimize the diluent concentrations to improve the wetting and penetrating characteristics of solventless systems used to impregnate electric machine coils and wound stators.

The final impregnant formulation, therefore, comprises a low viscosity, essentially 100 percent solids resin with a suitable curing agent, and a minor amount of a thixotropic agent. The formulation may also contain a surfactant and, in most cases, a diluent to maintain the viscosity and wettability at suitable levels. In addition, as is well known in the art, the impregnant formulations may contain modifiers, extenders, flexibilizers, coreactants, stabilizers, colorants, and accelerators.

Low viscosity, essentially 100 percent solids epoxy resin formulations are used as the base material in the preferred impregnants of the present invention. The epoxy resin used can be the readily available diglycidyl ether of bisphenol A, and preferably, the diglycidyl ether of bisphenol F. The bisphenol F species is preferred since it has a lower viscosity. If the electric machine is to be impregnated by a VPI process, the epoxy resins are preferably cured with relatively nonreactive anhydrides, such as the maleic anhydride adduct of methyl cyclopentadiene, and blocked accelerators or with one of several classes of latent curing agents, typical of which is boron trifluoride ($BF_3$) complexed with monoethylamine.

It is well known that thermoplastic acrylics, such as polymethyl methacrylate, make excellent electrical insulation. These aliphatic thermoplastic materials, however, exhibit relatively poor heat resistance and high shrinkage during cure, particularly when the viscosity of the solution is low enough to make a good impregnant. Some improvement in heat resistance can be achieved by adding a more functional acrylic, such as a diacrylate which is the reaction product of methacrylic acid with an aliphatic diol, or a more highly functional species which is the reaction product of the acid with glycerol, to the impregnant composition. Even with the addition of a more highly functional acrylic, shrinkage may reach values of 20 percent or more.

Shrinkage can be reduced by incorporating higher molecular weight species into the impregnant. Since the concentration of reactive sites determines the shrinkage, the inclusion of high molecular weight species which have fewer reactive sites per unit volume decreases the amount of shrinkage. If aromatic groups are incorporated into these higher molecular weight species, the heat resistance of the impregnant is upgraded.

These higher molecular weight, partially aromatic diacrylates and in particular dimethacrylates, exhibit high heat resistance and outstanding physical properties. Examples of such aromatic diacrylates are the reaction products of methacryloyl chloride and bisphenol A, of the diglycidyl ether of bisphenol A and methyl methacrylate, and of ethylene oxide/bisphenol A and methyl methacrylate. Since these aromatic resins are quite viscous, and in some cases are solids at room temperature, they are not suitable when undiluted for use in the impregnating composition of the present invention.

Low viscosity aromatic diacrylates, and preferably dimethacrylates, suitable for use in the impregnant formulations of the present invention can be obtained by selection of a suitable diluent. These formulations can be cured with peroxide curing agents which are latent at room temperature and break down at a practical cure temperature. Other ingredients commonly included in impregnant formulations can be added to the formulation. For example, a stabilizer may be incorporated to prevent copper ions from poisoning the cure mechanism at any plastic-copper interface within the electric machine.

Amorphous unsaturated liquid polyester casting resins are also well known to the insulation technology. Like the thermoplastic acrylics discussed above, these formulations are limited in heat resistance and relatively high in shrinkage. A typically viscous resin is produced by reacting propylene glycol with a 7:1 blend of adipic/fumaric acid and then diluted with enough styrene to obtain a useable impregnant. The properties can be improved by using an aromatic diol and by increasing the ratio of unsaturated to saturated acid. Crosslinking can be provided by the use of glycerol or bulky, compact, trifunctional species, such as substituted cyanuric acid. See Rogers, D.A., Jr., Proceedings of the 7th Electrical Insulation Conference, IEEE Publication No. 32 C 79, pp. 100–102 for additional details of these formulations.

Low viscosity polyesters suitable for use in the impregnant compositions of the present invention can be produced by the reactions discussed above and diluted with styrene, or with di- or trifunctional aliphatic diluents, such as those discussed previously with respect to aromatic diacrylates. The resultant low viscosity formulations can then be polymerized with peroxide curing agents, as in the case of the aromatic diacrylate formulations.

Other resins which may be used in the impregnant compositions of the present invention include silicone and polyurethane formulations having low viscosities and satisfactory tank lives. Suitable thixotropic agents and surfactants can be added to these silicone and polyurethane formulations to produce the novel impregnants of the present invention.

Diluents are generally required to reduce the viscosity of the epoxy resin formulation suited to the practice of this invention, to the desired level whether the anhydrides or blocked-boron curing agents are used. When the epoxy/anhydride systems are employed, aliphatic mono-functional epoxies can be used as diluents with some sacrifice in the cured properties, and preferably, aliphatic diepoxies can be used with less sacrifice in the cured properties, but at a greater expense. When the curing agent is of the blocked $BF_3$-type, aliphatic alcohols may be used as diluents. With $BF_3$ systems, short chain aliphatic alcohols with aromatic ring substituents, are preferred. Particularly preferred is benzyl alcohol, which improves storage stability of the catalyzed mixture, does not adversely affect cured properties, and, in fact, improves cured heat resistance. Other diluents in combination with specific curing agents are well known in the art. Generally, 2 to 20 percent by weight of a suitable reactive diluent must be added to reduce the room temperature viscosity of the impregnant formulation to the desired level of less than about 1500 centipoises, and preferably to less than about 500 centipoises at impregnation temperature.

One of the primary features of the impregnant formulations of the present invention useful in VPI processes is the inclusion of a minor amount of a thixotropic agent to assist retention in internal voids above capillary size and to permit formation of a thin regular exterior coating on the tapes of the construction. It is only necessary to add a few percent, generally less than about 7 parts of the high-surface-area, micron-size thixotropic agent of the present invention per hundred parts of resin, to prevent the formulation from freely running out after the impregnated coil or electric machine has been removed from the impregnating bath and exposed to curing temperatures. The term "high-surface-area" as used herein with respect to thixotropic agents refers to such agents having particle or fiber surface areas greater than about 50 m²/g. The term "micron-size" as used herein with respect to thixotropic agents refers to such agents having particle or fiber dimensions of about 10 millimicrons to about 10 microns. The impregnant formulation should be substantially free of non-thixotropic fillers. Otherwise the disadvantages and limitations associated with their use, as discussed above in reference to the prior art, will be encountered. Fumed silica may be used as the thixotropic agent in amounts of from about 2 to about 7 parts per hundred parts of resin. It has been reported, however, that fumed silica loses thixotropic action during long-term storage. The thixotropic agent perferred for use with the present invention is micron-size fibrous asbestos. Fibrous asbestos does not experience loss of thixotropic action, and is somewhat more efficient on a weight basis than fumed silica. The impregnant formulation need only contain from about 1 to about 5 parts of fibrous asbestos as the thixotropic agent per hundred parts of resin. The exact concentration will depend on the specific formulation and will be lower when hydroxyl groups are present to enhance thixotropy than when hydroxyl groups are absent. Because of the small particle size of the suitable thixotropic agents, they do not block the interstices of the insulating materials or coil bundles and the impregnant can readily penetrate the entire coil construction. It is important to note that in accordance with the present invention suitable impregnants are obtained by adding a minor amount of the thixotropic agent to the low viscosity, essentially 100 percent solids resinous material having a viscosity less than about 1500 centipoises at room temperature, and preferably less than about 500 centipoises at impregnation temperature, in an amount sufficient to increase the viscosity of the formulation to no more than about 5000 centipoises, and preferably, to between about 1300 and about 4000 centipoises. As long as the viscosity of the impregnant composition is maintained within these limits, any of the suitable essentially 100 percent solids synthetic resinous materials discussed above may be used in the formulation. It has been found that excessive heat or pressure is required to achieve the desired fill of the coil construction when the thixotropic agent is present in an amount that increases the measured Brookfield viscosity of the impregnant at room temperature to above about 5000 centipoises. Referring to FIG. 17 which is a plot of viscosity of the thixotropic 100 percent solids liquid impregnant of the present invention versus time for a given temperature at which the impregnant is maintained, it can be seen, for example, that an impregnant which is stored at a temperature of 75° F. has a useful working life of about 2¾ months within the preferred viscosity range.

The impregnant formulation with the thixotropic agent will not flow readily in the absence of pressure, but will flow smoothly when pressure is applied. Use of the thixotropic agent, therefore, is particularly advantageous with superatmospheric pressure is available, thereby forcing the impregnant expeditiously into the entire coil construction.

It is possible to replace all or a portion of the diluent used in the impregnant formulation with a minor amount of a surfactant to reduce the surface tension and thereby facilitate wetting and penetration of the coil construction. By adding a surfactant to the impregnant, it is also possible to reduce pressures, times, and temperatures during impregnation. It has been found in accordance with the present invention that about 1 part of surfactant per hundred parts of resin, and preferably from about 0.01 to about 0.10 part of surfactant per hundred parts of resin is all that need be added to achieve desirable results. Additional quantities, although not necessarily harmful, do not produce corresponding benefits. Suitable surfactants for reducing the surface tension of the impregnant composition include, for example, Union Carbide's A-186 silane (beta [3,4 epoxy cyclohexyl] ethyl trimethoxysilane), Air Products and Chemicals' Surfynol 104 (high molecular weight tertiary acetylenic glycol), and Rohm and Haas' Triton X-114 (alkyl aryl polyether alcohol).

Although the novel thixotropic low viscosity essentially 100 percent solids impregnants of the present invention may be directly substituted for conventional varnishes and impregnants in conventionally insulated electric machines, it has been found possible to produce the ultimate sealed electric machine capable of fulfilling the requirements of withstanding voltage while immersed in salt water by insulating them with the novel materials described in detail above, particularly the nonwoven or cut or uncut piled fabrics, prior to impregnation.

Electric machines, insulated conventionally or with the novel materials of the present invention, are vacuum pressure impregnated with the thixotropic impregnants of the present invention according to the following process. Air, moisture, and volatile solvents are first removed from the electric machine by heating the unit in an oven to above the boiling point of water and maintaining it at that temperature for a period of time sufficient to drive off most of the moisture. The unit is then cooled down, either in the shop or in the vacuum chamber, to a predetermined impregnation temperature. Small electric machines are cooled to an impregnation temperature of about 50° C., whereas larger electric machines containing larger heat sinks are cooled to an impregnation temperature of from about 32° C. to about 38° C. A vacuum of about 500–1000 microns is then pulled for about an hour to completely remove residual gas, moisture and solvents from the unit. The impregnant is then introduced into the chamber and the vacuum is maintained until bubbling ceases. After the vacuum is cut off, pressure of about 90–100 p.s.i. is applied to the chamber for at least about an hour. The unit is then removed from the chamber, allowed to drain, and transferred to an oven set at a temperature of from about 120° C. to about 150° C., and preferably from about 120° C. to about 135° C., and allowed to cure for about 6 to 8 hours.

A more complete appreciation of the invention will be realized by reference to the following specific examples relating to specific impregnant compositions and the processes used for impregnating electric machines with them. The following examples are not intended to limit the invention disclosed herein except to the extent that limitations are specifically stated or to the extent to which limitations appear in the appended claims.

EXAMPLE 1

The effect on retention of the addition of a minor amount of a fibrous asbestos thixotropic agent to a conventional 100 percent solids liquid epoxy resin was investigated. Coil sections about 6 inches long were half-lapped with mica tape and over-wrapped with glass or PET armoring tape. The ends of the coil sections were sealed with an epoxy putty to prevent the impregnant from entering through them. Each sample section was thoroughly dried in an oven and the exact weight of each was measured on a Mettler balance to one ten-thousandth of a gram. The sample sections were then vacuum pressure impregnated under identical conditions using impregnant formulations with and without the fibrous asbestos thixotropic agent. The fibrous asbestos had a surface area greater than about 60 m²/g, a fiber diameter of about 0.25 micron and a fiber length of about 5 microns. The data obtained is set forth in Table I below.

TABLE I

| Type of Insulation | Number of half-laps | Weight gain after VPI, grams | | Percent increase in retention |
|---|---|---|---|---|
| | | No asbestos | 1.12–1.5 phr asbestos | |
| mica/untreated glass tape | 3 | 5.40 | 9.11 | 69 |
| mica/untreated PET tape | 4 | 9.77 | 16.15 | 63 |
| mica tape | 4 | 5.50 | 10.04 | 83 |

As can be seen from the data in Table I, inclusion of a minor amount of a high-surface-area, micron-size thixotropic agent into a conventional 100 percent solids liquid impregnant significantly increases the retention of the resin within conventionally insulated coils by greater than 60 percent.

EXAMPLE 2

The effect on wetting and retention of the addition of a minor amount of surfactant to a thixotropic 100 percent solids epoxy resin was investigated. Swatches of PET nonwoven fabric about 2 inches square were weighed and impregnated for 15 minutes at full vacuum using four impregnant compositions having the following formulation to which was added 0.1 and 0.01 percent of Rohm and Haas' Triton X-114 (alkyl aryl polyether alcohol) and 0.1 and 0.01 percent of Air Products and Chemicals' Surfynol 104 (high molecular weight tertiary acetylenic glycol):

| | Parts by weight |
|---|---|
| Diglycidyl ether of bisphenol F | 100 |
| Benzyl alcohol | 15 |
| Boron trifluoride mono ethyl amine | 3.1 |
| Fibrous asbestos | 1.5 |
| AF - 66* | 0.0013 |

*General Electric 100% silicone solids antifoam compound.

The swatches were then drained until they were drip free and reweighed. The swatches were then transferred to an oven set at a temperature of about 135° C. and allowed to cure for about 4 hours. The data obtained is set forth in Table II below.

TABLE II

| Weight Percent Surfactant | Ratio Pickup 1 | Percent Drained 2 | Ratio Retained 3 |
|---|---|---|---|
| 0 | 36.49 | 36.90 | 23.02 |
| 0.10* | 34.92 | 42.10 | 20.22 |
| 0.01* | 34.38 | 42.83 | 19.66 |
| 0.10** | 34.90 | 36.47 | 23.16 |
| 0.01** | 35.60 | 32.06 | 23.82 |

*Triton X-114
**Surfynol 104

$$1 \frac{\text{Net weight of resin (uncured)}}{\text{Weight of nonwoven fabric}}$$

$$2 \frac{\text{Net weight of resin (uncured)} - \text{Net weight of resin (cured)}}{\text{Net weight of resin (uncured)}}$$

$$3 \frac{\text{Net weight of resin (cured)}}{\text{Weight of nonwoven fabric}}$$

From the data set forth in Table II, it would appear that the addition of either surfactant offered no advantage over the formulation without a surfactant. This, however, was not the case. Surfynol 104 was found to be particularly effective in wetting the nonwoven fabric so that the tendency to run off during curing was diminished. The impregnant remained uniformly distributed over the surfaces of the PET swatch when it was suspended vartically from one corner. This retention against the force of gravity was caused by capillary action and the fact that the free surface energy of the fibers within the swatch was greater than the surface tension of the impregnant. On the other hand, the impregnant formulation without the surfactant drained to the lower corner of the swatch so that the uppermost portions were quite dry. In this case there was no capillary action and the retention which occurred was caused by thixotropy. Since there did not appear to be much of a difference in retention between 0.1 and 0.01 percent surfactant concentrations, it was determined that 0.01 percent would be a sufficient amount.

What is claimed is:

1. A random wound electric machine having a stator impregnated with a cured impregnating material comprising:
   (a) a plurality of slots contained in said stator, each slot having a wall which defines a channel into which electrical coils are inserted through an opening in the stator;
   (b) a plurality of windings contained in each of said slots;
   (c) a layer of material disposed within each of the slots which encircles the windings within each slot and bridges the opening of each slot, the layer of material comprising a layer of insulative material disposed in contact with the wall of the slot and a first layer of fabric in contact with the layer of insulative material which is wettable, impregnatable and compressible, having a free surface energy greater than the surface tension of the impregnating material used for its impregnation and having capillary sized interstices disposed within the fabric which retain the impregnating material to produce a substantially void free fill of impregnating material between the fabric and the windings, the fabric being compressed by contact with the windings to substantially fill voids disposed between the wall and the windings with the fabric;

(d) the layer of material disposed within each of the slots comprising a slot liner and a reinforcing layer which bridges the opening in the stator for each slot, the slot liner and reinforcing layer each including the first fabric layer compressed by the windings, the reinforcing layer also including a second fabric layer compressed by contact with the first fabric layer of the slot liner, and having capillary sized interstices which retain the impregnating material to produce a substantially void free fill of impregnating material between reinforcing material and the windings; and (e) the fabric layer being wetted by the impregnating material prior to curing and impregnated with cured impregnating material by retention of the impregnating material within the capillary sized interstices.

2. A random would electric machine as recited in claim 1 wherein the layer of insulative material is bonded to the layer of fabric.

3. A random wound electric machine as recited in claim 1 further comprising:
a top stick disposed in the opening of each slot, the top stick having a top surface in contact with the wall of the slot and a bottom surface in contact with the insulative layer of the slot liner and the second fabric layer of the reinforcing layer.

4. A random wound electric machine as recited in claim 1 wherein the insulative layer of the reinforcing layer is heat resistant and the first and second fabric layers are nonwoven layers respectively bonded to different sides of the insulative layer.

5. A random wound electric machine as recited in claim 1 wherein the insulative layer of the reinforcing layer is heat resistant and the first and second fabric layers are cut pile fabric respectively bonded to different sides of the insulative layer.

6. A random would electric machine as recited in claim 1 wherein the insulative layer of the reinforcing layer is heat resistant and the first and second fabric layers are uncut pile fabric bonded to different sides of the insulative layer.

7. A random wound electric machine as recited in claim 2 wherein:
the layer of material disposed within each of the slots comprises a slot liner which is in contact with the wall of the slot and a reinforcing layer which bridges the opening of the slot in the stator, the slot liner and reinforcing layer each having the insulative layer and the fabric layer.

8. A random electric machine as recited in claim 7 further comprising:
a top stick disposed in the opening of each slot, the top stick having a top surface in contact with the wall of the slot and a bottom surface in contact with the insulative layer of the slot liner and the insulative layer of the reinforcing layer.

9. A random wound electric machine as recited in claim 8 wherein the reinforcing layer comprises:
a layer of heat resistant insulative material and a layer of non-woven fabric bonded to the heat resistant insulative material which contacts the windings and the insulative layer of the slot liner.

10. A random wound electric machine as recited in claim 8 wherein the reinforcing layer comprises: a layer of heat resistant insulative material and a layer of cut pile fabric bonded to the layer of heat resistant insulative material which contacts the windings and the insulative layer of the slot liner.

11. A random wound electric machine as recited in claim 8 wherein said reinforcing layer comprises:
a layer of heat resistant insulative material and a layer of uncut pile fabric bonded to the layer of heat resistant insulative material which contacts the windings and the insulative layer of the slot liner.

12. A random wound electric machine as recited in claim 4 wherein the first and second nonwoven fabric layers are PET and the insulative layer is manufactured from the group of materials consisting of PET and aramid paper.

13. A random wound electric machine as recited in claim 5 wherein the first and second cut pile fabric layers are PET and the insulative layer is manufactured from the group of materials consisting of PET and aramid paper.

14. A random wound electric machine as recited in claim 6 wherein the first and second uncut pile fabric layers are PET and the insulative layer is manufactured from the group of materials consisting of PET and aramid paper.

15. A random wound electric machine as recited in claim 1 wherein the first fabric layer of the reinforcing layer and the slot liner is PET, the second fabric layer of the reinforcing layer is PET and the insulative layer of the slot liner and reinforcing layer is manufactured from the group of materials consisting of PET and aramid paper.

16. A random wound electric maching having a stator impregnated with a cured impregnating material comprising:
(a) a plurality of slots contained in the stator, each slot having a wall which defines a channel into which electrical coils are inserted through an opening in the stator;
(b) a plurality of windings contained in each of the slots;
(c) a slot liner disposed in each of the slots between the wall and the windings;
(d) each slot liner comprising a layer of insulative material disposed in contact with the wall of the slot and a layer of fabric in contact with the layer of insulative material, the layer of fabric being wettable, impregnatable and compressible, having a free surface energy greater than the surface tension of an impregnating material used for its impregnation, having capillary sized interstices disposed within the fabric which retain the impregnating material to produce a substantially void free fill of impregnating material between the slot liner and the windings; and having a uncut pile and a backing, said backing being bonded to said layer of insulative material and said pile being in surface contact with said coils;
(e) the fabric being compressed by contact with the windings to substantially fill voids disposed between the wall and the windings with the fabric; and
(f) the fabric being wetted by the impregnating material prior to curing of the impregnating material and impregnated with cured impregnating material retained within the cpaillary sized interstices of the fabric.

17. A random wound electric machine as recited in claim 16 wherein the uncut pile fabric is PET and the insulative layer of material is manufactured from the group of materials consisting of PET and aramid paper.

18. A random wound electric machine having a stator impregnated with a cured impregnating material comprising:
(a) a plurality of slots contained in the stator, each slot having a wall which defines a channel into which electrical coils are inserted through an opening in the stator;
(b) a plurality of windings contained in each of the slots;
(c) a slot liner disposed in each of the slots between the wall and the windings;
(d) each slot liner comprising a layer of insulative material disposed in contact with the wall of the slot and a layer of fabric in contact with the layer of insulative material, the layer of fabric being wettable, impregnatable and compressible, having a free surface energy greater than the surface tension of an impregnating material used for its impregnation, having capillary sized interstices disposed within the fabric which retain the impregnating material to produce a substantially void free fill of impregnating material between the slot liner and the windings; and having a cut pile and a backing, said backing being bonded to said layer of insulative material and said pile being in surface contact with said coils;
(e) the fabric being compressed by contact with the windings to substantially fill voids disposed between the wall and the windings with the fabric; and
(f) the fabric being wetted by the impregnating material prior to curing of the impregnating material and impregnated with cured impregnating material retained within the capillary sized interstices of the fabric.

* * * * *